(12) United States Patent  
Shirai

(10) Patent No.: US 12,134,041 B2
(45) Date of Patent: Nov. 5, 2024

(54) IMAGE PROCESSING PROGRAM, IMAGE PROCESSING METHOD, AND IMAGE PROCESSING APPARATUS

(71) Applicant: GREE, Inc., Tokyo (JP)

(72) Inventor: Akihiko Shirai, Kanagawa (JP)

(73) Assignee: GREE, INC., Tokyo (JP)

( * ) Notice: Subject to any disclaimer, the term of this patent is extended or adjusted under 35 U.S.C. 154(b) by 128 days.

(21) Appl. No.: 17/707,971

(22) Filed: Mar. 30, 2022

(65) Prior Publication Data

US 2022/0370924 A1 Nov. 24, 2022

(30) Foreign Application Priority Data

May 18, 2021 (JP) ................................. 2021-083647
Dec. 27, 2021 (JP) ................................. 2021-211961

(51) Int. Cl.
*A63F 13/85* (2014.01)
*A63F 13/30* (2014.01)
*A63F 13/79* (2014.01)
*G06F 21/10* (2013.01)

(52) U.S. Cl.
CPC .............. *A63F 13/85* (2014.09); *A63F 13/30* (2014.09); *A63F 13/79* (2014.09); *G06F 21/10* (2013.01)

(58) Field of Classification Search
CPC ............. G07F 17/3244; G07F 17/3267; G07F 17/3258
See application file for complete search history.

(56) References Cited

U.S. PATENT DOCUMENTS

| 2009/0118008 | A1  | 5/2009 | Kobayashi et al. |
| 2009/0131177 | A1  | 5/2009 | Pearce |
| 2016/0139777 | A1* | 5/2016 | Pinho ................... G06V 10/235 715/771 |
| 2016/0158656 | A1* | 6/2016 | Condrey ................ A63F 13/63 463/31 |
| 2016/0171835 | A1* | 6/2016 | Washington ........ G07F 17/3223 463/25 |

(Continued)

FOREIGN PATENT DOCUMENTS

| JP | 2009-112550 A | 5/2009 |
| JP | 2009-187081 A | 8/2009 |

(Continued)

OTHER PUBLICATIONS

Notice of reasons for refusal mailed on Nov. 30, 2021, received for JP Application 2021-083647,9 pages including English Translation.

(Continued)

*Primary Examiner* — David L Lewis
*Assistant Examiner* — Eric M Thomas
(74) *Attorney, Agent, or Firm* — XSENSUS LLP

(57) ABSTRACT

An image processing method comprises receiving content; displaying the content on a display; detecting a capture trigger for capturing a screenshot of the content displayed on the display; acquiring additional information relating to the content displayed on the display at a capture timing corresponding to a timing at which the capture trigger is detected; and capturing the screenshot of the content displayed on the display at the capture timing and adding the additional information to the screenshot to generate an additional-information-added image.

21 Claims, 20 Drawing Sheets

(56) References Cited

U.S. PATENT DOCUMENTS

2017/0036109 A1    2/2017  Matsumoto
2021/0097508 A1*   4/2021  Papanikolas ....... G06Q 20/3678

FOREIGN PATENT DOCUMENTS

| JP | 2010-517186 A | 5/2010 |
| JP | 2015-58072 A | 3/2015 |
| JP | 2017-29509 A | 2/2017 |

OTHER PUBLICATIONS

"How to take screenshots of iPhone and Android smartphones", MEMORVA, Sep. 17, 2018, pp. 1-4 (9 pages including English Translation).

* cited by examiner

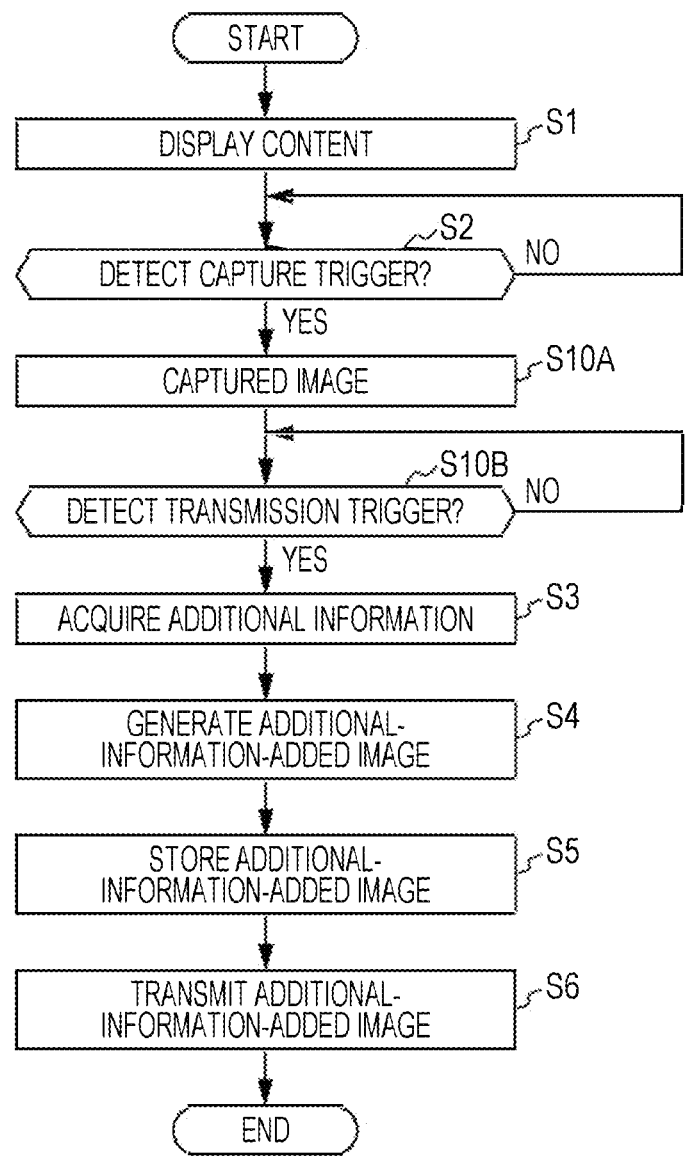

ard.com/patents/US12134041B2

IMAGE PROCESSING PROGRAM, IMAGE PROCESSING METHOD, AND IMAGE PROCESSING APPARATUS

CROSS-REFERENCE TO RELATED APPLICATIONS

The present application claims priority to JP 2021-083647, filed May 18, 2021, and to JP 2021-211961, filed Dec. 27, 2021, the content of both of which is hereby incorporated by reference in their entirety.

BACKGROUND

Conventionally, operating systems (OS) such as iOS (registered trademark) and Android (registered trademark) have a function of capturing a screen displayed on a display. However, by such a capture function, only the displayed screen can be captured as it is.

SUMMARY

An image processing method in accordance with the present disclosure comprises receiving content; displaying the content on a display; detecting a capture trigger for capturing a screenshot of the content displayed on the display; acquiring additional information relating to the content displayed on the display at a capture timing corresponding to a timing at which the capture trigger is detected; and capturing the screenshot of the content displayed on the display at the capture timing and adding the additional information to the screenshot to generate an additional-information-added image.

BRIEF DESCRIPTION OF THE DRAWINGS

FIG. 6C is a flowchart illustrating another example of processing operations of the terminal apparatus in FIG. 4.

DETAILED DESCRIPTION OF THE DRAWINGS

Figure 1:
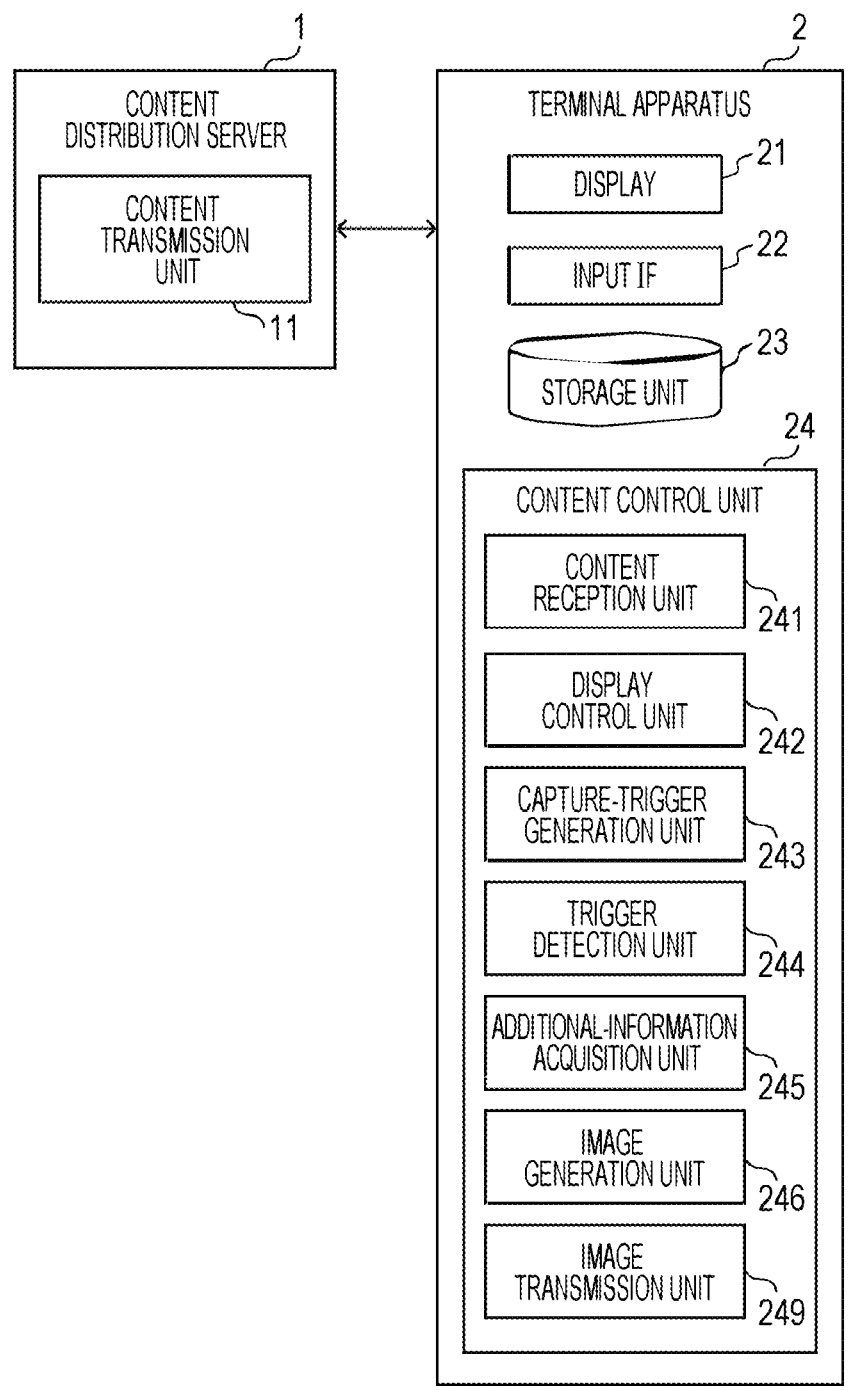
FIG. 1 is a block diagram illustrating a schematic configuration of an image processing system according to a first embodiment.

According to an aspect of the present application, there is provided an image processing program causing a computer to function as: a display control unit that causes content to be displayed on a display; a trigger detection unit that detects a capture trigger for capturing a screen displayed on the display; an additional-information acquisition unit that acquires additional information in accordance with what is displayed on the display at a capture timing corresponding to a timing at which the capture trigger is detected; and an image generation unit that captures a screen displayed on the display at the capture timing and adds the additional information to a captured image to generate an additional-information-added image.

The computer may be further caused to function as a content reception unit that receives the content, and the display control unit may cause the content received by the content reception unit to be displayed on the display.

The additional-information acquisition unit may acquire the additional information in accordance with the content displayed on the display at the capture timing.

The additional-information acquisition unit may acquire the additional information in accordance with a scene of the content displayed on the display at the capture timing. The additional-information acquisition unit may acquire the additional information regarding an object included in the scene.

The computer may be further caused to function as: a content information reception unit that receives content information; and a content generation unit that generates the content on the basis of the content information, in which the display control unit may cause the content generated by the content generation unit to be displayed on the display, and the additional-information acquisition unit may acquire the additional information on the basis of the content information.

The content information may include object information regarding an object appearing in the content, and the additional-information acquisition unit may acquire the additional information on the basis of the object information.

The object may include an avatar that acts in a three-dimensional virtual space, and the additional information may include information regarding the avatar and/or information regarding a performer corresponding to the avatar.

The object appearing in the content may include a plurality of avatars that act in a three-dimensional virtual space, and, if what is displayed on the display at the capture timing is a first avatar of the plurality of avatars, the additional information may include information regarding at least part of the first avatar and/or information regarding at least part of a performer corresponding to the first avatar but may not include information regarding a second avatar of the plurality of avatars or information regarding a performer corresponding to the second avatar.

The additional-information acquisition unit may grasp the first avatar displayed on the display at the capture timing on the basis of the content information.

The additional-information acquisition unit may give a notification of the capture timing to a content distribution server that transmits the content information, and may acquire the additional information on the basis of information received from the content distribution server in response to the notification.

The computer may be further caused to function as an image transmission unit that transmits the additional-information-added image to an external apparatus.

The image generation unit may generate, in response to the capture trigger being detected, the additional-information-added image, and the image transmission unit may transmit the additional-information-added image to the external apparatus.

The computer may be further caused to function as a transmission-trigger generation unit that generates, in response to a user operation, a transmission trigger for transmitting the additional-information-added image to the external apparatus, in which the trigger detection unit may detect the transmission trigger, and the image generation unit may capture, in response to the capture trigger being detected, a screen displayed on the display at the capture timing, and may add, in response to the transmission trigger being detected, the additional information to the captured image to generate the additional-information-added image, and the image transmission unit may transmit, in response to the transmission trigger being detected, the additional-information-added image to the external apparatus.

The external apparatus may be a content distribution server that transmits the content information.

The external apparatus may be a management server of a social networking service (SNS) application for displaying the additional-information-added image on the SNS application.

The computer may be further caused to function as a rights-information generation unit that generates a rights information page unique to the additional-information-added image.

The rights information page may include information for circulating the additional-information-added image as a unique digital asset.

The additional information may include a uniform resource locator (URL) associated with the rights information page.

The computer may be further caused to function as: a content information reception unit that receives content information; and a content generation unit that generates the content on the basis of the content information, in which the display control unit may cause the content generated by the content generation unit to be displayed on the display, and the rights-information generation unit may generate rights information that constitutes the rights information page on the basis of the content information.

The content information may include object information regarding an object appearing in the content, and the rights-information generation unit may generate the rights information on the basis of the object information.

The object may include an avatar that acts in a three-dimensional virtual space, and the rights information may include information regarding the avatar and/or information regarding a performer corresponding to the avatar.

The additional information may include a URL associated with a webpage in accordance with what is displayed on the display at the capture timing.

The image generation unit may add the additional information as meta data of the captured image to generate the additional-information-added image.

The additional information may be an additional image in accordance with what is displayed on the display at the capture timing, and the image generation unit may superpose the additional image on the captured image to generate the additional-information-added image.

The additional image may include text, and the image generation unit may add the text in a color in accordance with the captured image.

The computer may be further caused to function as a capture-trigger generation unit that provides a user with a graphical user interface (GUI) for generating the capture trigger and generates, in response to a user operation on the GUI, the capture trigger.

According to another aspect of the present application, there is provided an image processing method including: causing content to be displayed on a display; detecting a capture trigger for capturing a screen displayed on the display; acquiring additional information in accordance with what is displayed on the display at a capture timing corresponding to a timing at which the capture trigger is detected; and capturing a screen displayed on the display at the capture timing and adding the additional information to a captured image to generate an additional-information-added image.

According to another aspect of the present application, there is provided an image processing apparatus including: a display control unit that causes content to be displayed on a display; a trigger detection unit that detects a capture trigger for capturing a screen displayed on the display; an additional-information acquisition unit that acquires additional information in accordance with what is displayed on the display at a capture timing corresponding to a timing at which the capture trigger is detected; and an image generation unit that captures a screen displayed on the display at the capture timing and adds the additional information to a captured image to generate an additional-information-added image. A new capture process can be performed.

Now, embodiments will specifically be described below with reference to the drawings.

First Embodiment

FIG. 1 is a block diagram illustrating a schematic configuration of an image processing system according to a first embodiment. The image processing system includes a content distribution server 1 and a terminal apparatus 2.

The content distribution server 1 includes a content transmission unit 11 that transmits content to the terminal apparatus 2. In an exemplary implementation, content distribution server 1 includes processing circuitry that is configured to perform or control the functionality of content transmission unit 11. The processing circuitry will be described later with respect to FIG. 15. The content to be transmitted is not limited to any particular one and may be, for example, a movie, a concert, a game, etc. An actor, a filming setup, a singer, a costume, a game character, a game item, etc. appearing in the content may collectively be referred to as an object. The content transmission unit 11 may also transmit information regarding additional information, which will be described later, to the terminal apparatus 2.

The terminal apparatus 2 is used by a user and is any computer such as a smartphone, a tablet terminal, a personal computer, or a head mounted display (HMD). The terminal apparatus 2 includes a display 21, an input interface 22, a storage unit 23, and a content control unit 24. In an exemplary implementation, terminal 2 includes processing circuitry that is configured to perform or control the functionality of display 21, an input interface 22, a storage unit 23, and a content control unit 24. The processing circuitry will be described later with respect to FIG. 15.

If the terminal apparatus 2 is a smartphone or a tablet terminal, the input interface 22 may be a touch panel. The touch panel is superposed on the display 21 in a given positional relationship. Thus, for example, a selectable icon can be displayed at a predetermined position on the display 21, and, if a corresponding position on the touch panel is touched, the terminal apparatus 2 can acquire that the icon is selected.

If the terminal apparatus 2 is a personal computer, the input interface 22 is, for example, a mouse or a touch pad.

If the terminal apparatus 2 is an HMD, the HMD contains the display 21. The display 21 can display a three-dimensional virtual space. The input interface 22 is, for example, a controller for operating a pointer in the space displayed on the display 21 or a button provided for the HMD.

The storage unit 23 of the terminal apparatus 2 is consisted of a random access memory (RAM), a read-only memory (ROM), etc. and stores various programs and an additional-information-added image, which will be described later. Note that the storage unit 23 is not necessarily inside the terminal apparatus, and, for example, the additional-information-added image etc. may be stored in a storage apparatus in cloud connected to the terminal apparatus 2 via a network.

The content control unit 24 includes a content reception unit 241, a display control unit 242, a capture-trigger generation unit 243, a trigger detection unit 244, an additional-information acquisition unit 245, an image generation unit 246, and an image transmission unit 249. Any or all of the units in the content control unit 24 may be implemented by a processor of the terminal apparatus 2, e.g., processing circuitry, executing a predetermined content control program, or may be implemented by hardware, or may be a function of the OS. In other words, the content control unit 24 provides a user with a content control application in collaboration with the content distribution server 1.

The content reception unit 241 receives content from the content distribution server 1.

The display control unit 242 causes the received content to be displayed on the display 21. As an example, the display control unit 242 causes the content to be displayed in a content display region 91, which is part of the display 21 (see FIG. 2).

Referring back to FIG. 1, in response to a predetermined operation being performed by a user using the input interface 22, the capture-trigger generation unit 243 generates a trigger (hereinafter referred to as "capture trigger") for capturing (acquiring a screenshot of) a screen displayed on the display 21. More specifically, the capture-trigger generation unit 243 provides a user with a graphical user interface (GUI) for generating the capture trigger. Then, in response to the predetermined operation being performed by a user on the GUI, the capture-trigger generation unit 243 generates the capture trigger.

Figure 2:
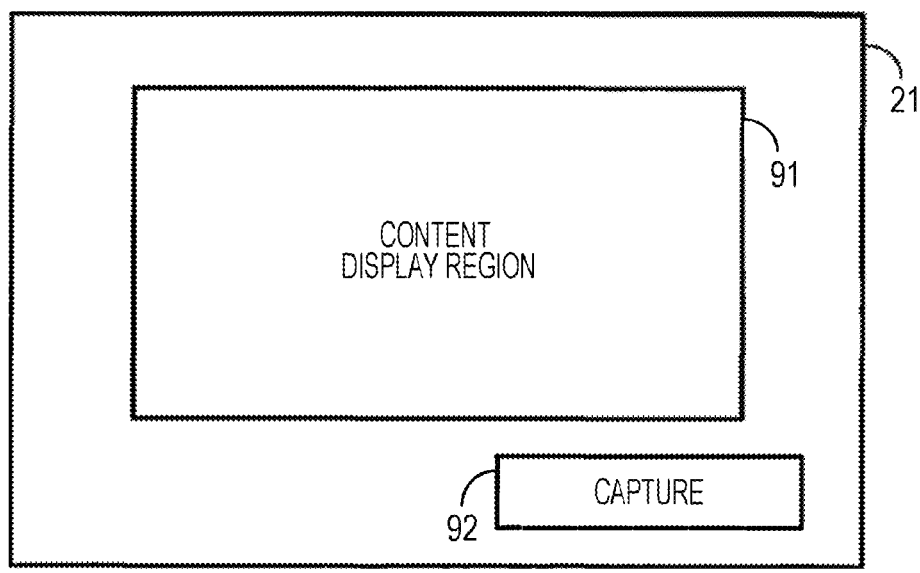
FIG. 2 schematically illustrates an example of a screen displayed on a display.

For example, the capture-trigger generation unit 243 causes a capture icon 92 (GUI) to be displayed in a region different from the content display region 91 on the display 21 (see FIG. 2). Then, in response to the capture icon 92 being selected by using the input interface 22, the capture-trigger generation unit 243 generates the capture trigger.

Referring back to FIG. 1, the trigger detection unit 244 detects the capture trigger. The capture trigger may be generated by the capture-trigger generation unit 243. Alternatively, the trigger detection unit 244 may detect, as the capture trigger, a predetermined operation (e.g., pressing a plurality of buttons provided for a smartphone at the same time) for capturing the screenshot based on a function of the OS being performed on the input interface 22 of the terminal apparatus 2, or the screenshot being captured based on a function of the OS of the terminal apparatus 2.

In addition, the capture trigger may be generated regardless of a user operation, and the trigger detection unit 244 may detect this capture trigger. For example, the capture trigger may be generated by the content control unit 24, and the trigger detection unit 244 may detect this capture trigger. In this case, regardless of a user operation, an additional-information-added image (described later) is generated and stored in the storage unit 23 in the terminal apparatus 2 or transmitted to an external apparatus.

The capture trigger may also be generated when predetermined conditions are met. Some examples of predetermined conditions which, when met, may prompt generation of the capture trigger include:

When a number of graphic objects on the screen increases and/or when the number of graphic objects (gifts, emotes, etc.) sent from a viewer to a distributor increases/exceeds a threshold value, e.g., to indicate that a distribution content is gaining momentum. Determination may be made on either a server side or a client terminal side;

Period of time allowed by a right holder;

Period during which a specific character is displayed;

An avatar delivering the content sets a screenshot period during the delivery of the content (e.g., saying "now is the time to take a screenshot"); or When a popular character, avatar, content, or scene is displayed. Records the history of past screenshots and non-fungible token(s) (NFT) in association with the information (avatars, contents, etc.) contained in the screenshots, and aggregates the popularity level.

When the predetermined conditions are met, a screenshot button and/or an NFT generation button are displayed on the content generation screen. Alternatively, the button(s) may be always be displayed, and when the predetermined conditions are met, the screenshot button and/or the NFT generation button are then prominently displayed to make it easier for selection by a user. In an exemplary implementation of the present disclosure, the capturing of screenshots and/or NFT is not limited to still images but can also include video or other types of moving video. For example, video data may be generated by acquiring a start and end instruction timing of a screenshot or NFT generation instruction. The screenshot, or plural screenshots making a video are captured from a start timing to an end timing indicated by the start and end instruction timing Additionally, images, video and/or audio may be integrated together and/or be utilized independently in the capturing of a screenshot. The screenshots may be stored and then converted into an NFT by the user for distribution to a blockchain.

In an exemplary implementation, a popularity level may be aggregated by counting and recording a number of views of uploaded screenshots and NFTs. Then, a ranking is generated based on a number of views and/or likes of the screenshots. Additionally or alternatively, a number of times a normal capture and an NFT-generated capture are acquired is aggregated, respectively. A ranking of the content, scenes, characters, etc. contained in screenshots is then generated (e.g., ranking of characters with the most number of scrubbed images). The ranking may be used for a user to access content, scene, and character related information or pages. Additionally, a popularity index or scarcity index (inverse of popularity index) may be added to or made corresponding to a screenshot as additional information (e.g., a tag indicating that the screenshot is a scrubbed image of a popular scene). Additionally, when it is detected (e.g. by the server) that an NFT has been generated, the server will notify the owner of the avatar contained in the NFT and other users who were viewing the content of the avatar that an NFT has been generated. The notification will provide an effect that users would know what has been generated into an NFT.

Referring back to FIG. 1, the additional-information acquisition unit 245 acquires additional information in accordance with what is displayed on the display 21 at a capture timing corresponding to a timing at which the capture trigger is detected. The additional information in accordance with what is displayed on the display 21 is, in other words, additional information in accordance with details displayed on the display 21 or additional information in accordance with a screen (image) displayed on the display 21. One of features of this embodiment is that the additional information is not fixed, but is information in accordance with the screen displayed on the display 21 at the capture timing.

Note that the additional-information acquisition unit 245 does not necessarily analyze what is displayed, for example, in order to acquire the additional information in accordance with what is displayed on the display 21. The additional-information acquisition unit 245 may, for example, acquire the additional information in accordance with what is displayed on the display 21 from the outside. For example, on the basis of the capture timing, the additional-information acquisition unit 245 may analyze data contained in data (e.g., content) received from the content distribution server 1 or may inquire of the content distribution server 1.

The capture timing herein is typically a point in time at which the capture trigger is generated (e.g., a point in time at which a user selects the capture icon 92) or may be a point in time shifted from such a point in time to some extent. Alternatively, the capture timing may be a period based on a point in time at which the capture trigger is generated, specifically, a prescribed period from a reference point in time, or may be a period between a reference point in time and a capture ending operation performed by a user.

The additional-information acquisition unit 245 may generate the additional information by itself, obtain an additional image from the outside (e.g., the content distribution server 1), generate the additional information on the basis of information obtained from the outside, or select any one piece of pieces of additional information prepared in advance, and in any case, the additional information is expressed as being "acquired". Specific examples of the additional information will be described later.

The image generation unit 246 captures a screen displayed on the display 21 at the capture timing and adds the additional information to the captured image to generate an additional-information-added image. Then, the image generation unit 246 stores the additional-information-added image in the storage unit 23. If the capture timing is a specific point in time, the additional-information-added image to be generated is a still image. If the capture timing is a specific period, the additional-information-added image to be generated is a video. Note that the image generation unit 246 may store the captured image (to which no additional information is added) together in the storage unit 23.

As an example, the additional information is an image (hereinafter referred to as "additional image"), and the image generation unit 246 may capture a screen displayed on the display 21 at the capture timing and superpose the additional image on it to generate the additional-information-added image. The additional image may be a still image, a video, or text. As another example, the image generation unit 246 may capture a screen displayed on the display 21 at the capture timing and add the additional information to it as meta data to generate the additional-information-added image. The additional information in this case is, for example, a uniform resource locator (URL) associated with a specific webpage.

Figure 3:
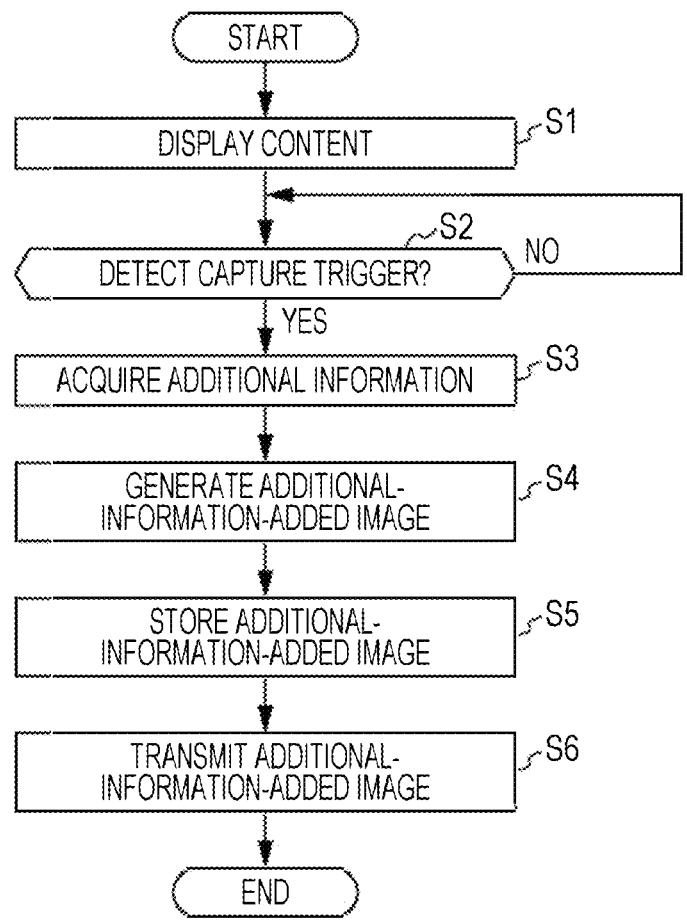
FIG. 3 is a flowchart illustrating an example of processing operations of a terminal apparatus in FIG. 1.

The image transmission unit 249 transmits the generated additional-information-added image to any given external apparatus. The transmitted image is stored in a storage apparatus accessible from the external apparatus. The external apparatus may be a management server of another application for displaying the additional-information-added image by the other application, such as a social networking service (SNS) application. Alternatively, the external apparatus may be the content distribution server 1. FIG. 3 is a flowchart illustrating an example of processing operations of the terminal apparatus 2 in FIG. 1.

The display control unit 242 causes content received by the content reception unit 241 to be displayed on the display 21 (step S1). While the content is being displayed, at any given point in time at which capture is desired, a user of the terminal apparatus 2 can select the capture icon 92 in FIG. 2, for example, to generate a capture trigger. In response to the capture trigger being detected by the trigger detection unit 244 (YES in step S2), the additional-information acquisition unit 245 acquires additional information in accordance with a screen displayed on the display 21 at the capture timing (step S3).

Subsequently, the image generation unit 246 captures the screen displayed on the display 21 at the capture timing and adds the additional information to it to generate an additional-information-added image (step S4). The generated additional-information-added image is stored in the storage unit 23 (step S5). In addition, the image transmission unit 249 may transmit the additional-information-added image to an external apparatus (step S6).

In the above manner, in this embodiment, in response to the capture trigger being detected (step S2), without any further user operation, the additional information is acquired (step S3), the additional-information-added image is generated (step S4), the additional-information-added image is stored (step S5), and the additional-information-added image is transmitted to the external apparatus.

Now, some specific examples of the additional information will be described. The additional information can be information in accordance with content that is displayed (i.e., which content is displayed) on the display 21 at the capture timing. More specifically, the additional information may be a name of content (hereinafter referred to as "content name") displayed on the display 21 at the capture timing. The content name is not necessarily an official name of the content, but may be an abbreviation thereof or information by which the content can be identified. In the generated additional-information-added image, for example, the content name (and a copyright notice etc. as necessary) as the additional information is superposed on a captured image.

Another example of the additional information in accordance with the content may be a URL associated with an advertisement, a publicity image, an official website, etc. related to the content. In this case, in the generated additional-information-added image, a URL as the additional information is superposed as an image on a captured image. Alternatively, in the generated additional-information-added image, a URL as the additional information is added as meta data of a captured image. Upon selection of the URL in the additional-information-added image to which such meta data is added, a webpage associated with the URL is acquired and displayed.

Another example of the additional information in accordance with the content may be information regarding an object in the content. The object is a performer, an avatar, a part of the avatar, a user of the avatar, a gift, etc. appearing in the content.

To generate such an additional-information-added image, the content distribution server 1 transmits, not only the content, information indicating the content name, the above URL, the information regarding the object in the content, etc. to the terminal apparatus 2. Thus, the additional-information acquisition unit 245 can acquire the content name etc. Alternatively, in response to a capture trigger being detected, the additional-information acquisition unit 245 may inquire the content distribution server 1 of the content name etc. Specifically, the additional-information acquisition unit 245 gives a notification of the capture timing to the content distribution server 1. In response to this notification, the content distribution server 1 may transmit, to the terminal apparatus 2, the information etc. indicating the name of content that is distributed to the terminal apparatus 2 at the capture timing.

Video data to be delivered by a delivery user through an avatar may be generated via client rendering or server rendering. When client rendered, an avatar image and drawing program may be already in an application of the terminal apparatus, and identification information of the avatar image, motion data, and sound data are received from the server and rendered on a terminal side. When server rendered, the server may collect operation information from terminals, and the server then generates video data on the server side and broadcasts the video data to each terminal.

Note that the additional information in this example is determined depending on whether which content is displayed at the capture timing, regardless of the point in time of the content at which a capture trigger is detected. For example, additional information in a case where a capture trigger is detected in an early stage of the content is identical with additional information in a case where a capture trigger is detected in a later stage of the content.

In contrast, as another specific example, the additional information may differ depending on the point in time of the content at which a capture trigger is detected.

For example, the additional information may also be information in accordance with a scene in the content displayed (i.e., what kind of scene is displayed) on the display 21 at the capture timing.

As an example of the additional information in accordance with a scene, the additional information may be information regarding an object, such as an actor, a filming setup, a singer, a costume, a game character, or a game item, included in a scene displayed on the display 21 at the capture timing.

As an example of the additional information regarding an object, the additional information may be a name of the object (hereinafter referred to as "object name"). The object name is not necessarily an official name of the object, but may be an abbreviation thereof or information by which the object can be identified.

In this case, in the generated additional-information-added image, the object name as the additional information is superposed. In addition, for example, a name of an appearing character (object name) as the additional information is superposed on a captured image. Otherwise, the additional information may include information regarding the object other than the object name (e.g., rarity of a character if the object is a game character), a name of a content distribution application, etc.

Another example of the additional information in accordance with the object may be a URL associated with an advertisement, a publicity image, an official website, a website for buying the object, etc. related to the object. In this case, in the generated additional-information-added image, a URL as the additional information is superposed as an image on a captured image. Alternatively, in the generated additional-information-added image, a URL as the additional information is added as meta data of a captured image. Upon selection of the URL in the additional-information-added image to which such meta data is added, a webpage associated with the URL is acquired and displayed.

As another example of the additional information in accordance with a scene, the additional information may be information in accordance with a filming location of a scene displayed on the display 21 at the capture timing. More specifically, the additional information may be an advertisement etc. of the filming location, or a store, a sightseeing spot, a theme park, etc. at the filming location.

In the above manner, to acquire the additional information in accordance with a scene, the content distribution server 1 transmits, in addition to the content, additional information in accordance with each scene of the content to the terminal apparatus 2. Thus, the additional-information acquisition unit 245 can acquire the additional information in accordance with a scene displayed at the capture timing. Alternatively, in response to the capture trigger being detected, the additional-information acquisition unit 245 may inquire the content distribution server 1 of the additional information. Specifically, the additional-information acquisition unit 245 gives a notification of the capture timing to the content distribution server 1. In response to this notification, the content distribution server 1 may transmit, to the terminal apparatus 2, additional information in accordance with a scene of the content that is distributed to the terminal apparatus 2 from the content distribution server 1 at the capture timing.

As another specific example, the additional information may be, not a scene displayed on the display 21 at the capture timing in the content, but information in accordance with a rough time slot (e.g., whether an early stage, a middle stage, or a later stage) of the capture timing in the content. Note that a screen displayed on the display 21 differs depending on the time slot of the capture timing, and thus, the additional information in accordance with the time slot of the capture timing is, in other words, additional information in accordance with a screen displayed on the display 21 at the capture timing.

As a more specific example, if the content is a movie, additional information in a case where a capture trigger is detected in an early stage of the movie may differ from additional information in a case where a capture trigger is detected in a later stage. Alternatively, if the content is a concert, additional information that differs depending on which song is displayed when a capture trigger is detected may be acquired.

In the above manner, in the first embodiment, the content displayed on the display 21 is not captured as it is, but the additional-information-added image in which the additional information is added to the captured image can be generated. In addition, the additional information is not fixed information, but may be additional information in accordance with a screen displayed on the display 21.

Figure 4:
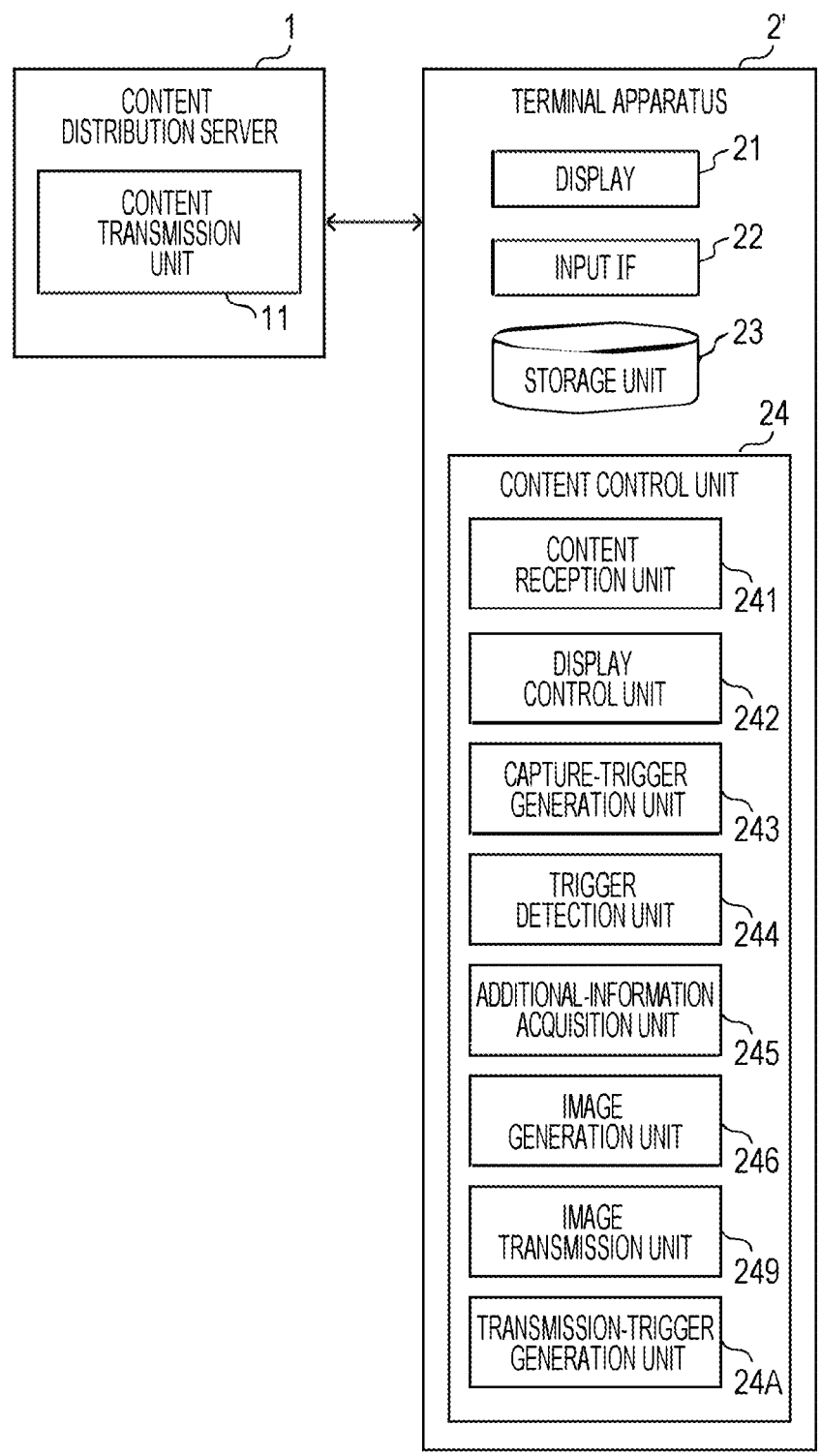
FIG. 4 is a block diagram illustrating a schematic configuration of an image processing system according to a modification of the image processing system in FIG. 1.

FIG. 4 is a block diagram illustrating a schematic configuration of an image processing system according to a modification of the image processing system in FIG. 1, including a terminal apparatus 2'.

In the image processing system in FIG. 1, in response to a capture trigger being detected, without any further user operation, additional information is acquired, an additional-information-added image is generated, the additional-information-added image is stored in the terminal apparatus 2, and the additional-information-added image is transmitted to an external apparatus. In contrast, in the image processing system in FIG. 4, after a capture trigger is detected, in response to a transmission trigger being further generated by a user for transmitting an image, an additional-information-added image is generated, the additional-information-added image is stored in the terminal apparatus 2', and the additional-information-added image is transmitted to an external apparatus.

Specifically, the content control unit 24 in the terminal apparatus 2' in FIG. 4 includes a transmission-trigger generation unit 24A. In response to a predetermined operation being performed by a user using the input interface 22, the transmission-trigger generation unit 24A generates a transmission trigger for transmitting an additional-information-added image to an external apparatus. More specifically, the transmission-trigger generation unit 24A provides a user with a GUI for generating a transmission trigger. In addition, in response to a predetermined operation being performed by a user on the GUI, the transmission-trigger generation unit 24A generates a transmission trigger.

Figure 5:
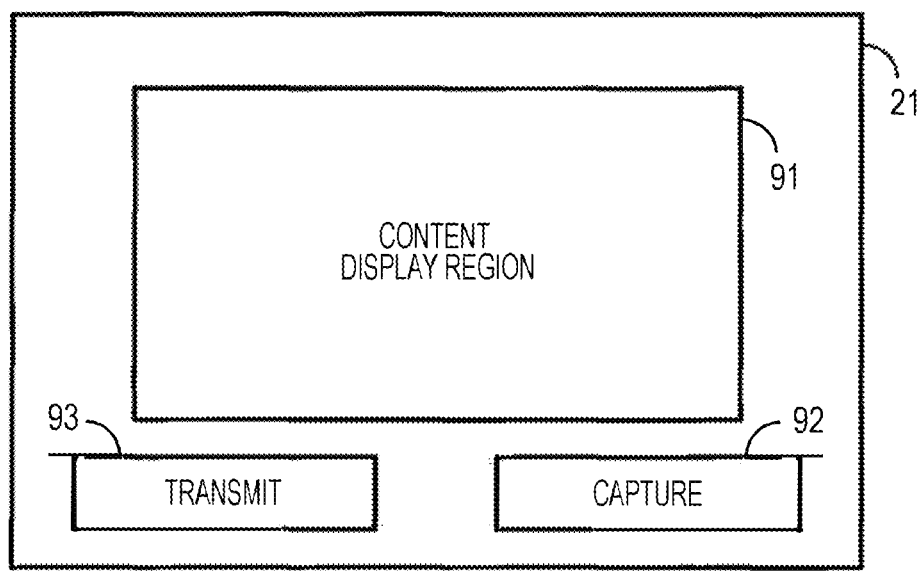
FIG. 5 schematically illustrates an example of a screen displayed on the display.

For example, as illustrated in FIG. 5, the transmission-trigger generation unit 24A causes a transmission icon 93 (GUI) to be displayed in a region different from the content display region 91 and the capture icon 92 on the display 21. In response to the transmission icon 93 being selected by using the input interface 22, the transmission-trigger generation unit 24A generates a transmission trigger. The generated transmission trigger is detected by the trigger detection unit 244. That is, the trigger detection unit 244 detects both the capture trigger and the transmission trigger.

Figure 6A:
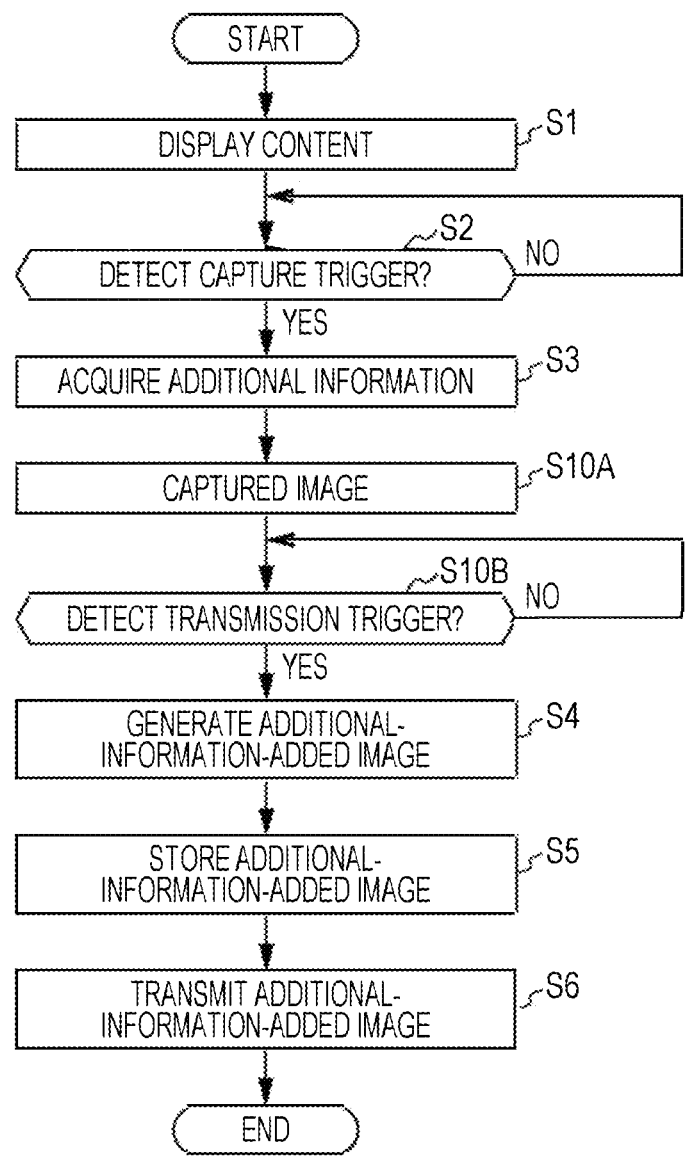
FIG. 6A is a flowchart illustrating an example of processing operations of a terminal apparatus in FIG. 4.

FIG. 6A is a flowchart illustrating an example of processing operations of the terminal apparatus 2' in FIG. 4. Processing common to that in FIG. 3 is denoted by a common reference numeral, and steps S1 to S3 are common to those in FIG. 3.

While an additional-information-added image is generated in response to a capture trigger in FIG. 3, in this modification illustrated in FIG. 6A, in response to a capture trigger being detected, the image generation unit 246 only captures a screen displayed on the display 21 at the capture timing and acquires a captured image (step S10A, and stores the captured image in the storage unit 23 in the terminal apparatus 2' as necessary) and does not generate an additional-information-added image at this point in time.

In response to the transmission trigger being detected by the trigger detection unit 244 (YES in step S10B), the image generation unit 246 adds additional information to the captured image acquired in step S10A to generate an additional-information-added image (step S4). The generated additional-information-added image is stored in the storage unit 23 in the terminal apparatus 2' (step S5). In addition, the image transmission unit 249 transmits the additional-information-added image to an external apparatus (step S6).

In the above manner, in this modification, in response to the capture trigger being detected (step S2), without any further user operation, the additional information is acquired (step S3), and the screen is captured (step S10A). Subsequently, in response to the transmission trigger being detected (step S10B), without any further user operation, the additional-information-added image is generated (step S4), the additional-information-added image is stored in the terminal apparatus 2' (step S5), and the additional-information-added image is transmitted to the external apparatus (step S6). In this modification, the additional-information-added image is generated in a case where the image is to be transmitted to the external apparatus.

Note that in the terminal apparatus 2' in FIG. 4, a user may select whether processing until the transmission of the additional-information-added image is to be performed in response to the capture trigger being detected (without detecting a transmission trigger) as illustrated in FIG. 3 or processing until the capturing of the screen is to be performed in response to the capture trigger being detected and processing until the transmission of the additional-information-added image is to be performed in response to the transmission trigger being detected as illustrated in FIG. 6A.

Figure 6B:
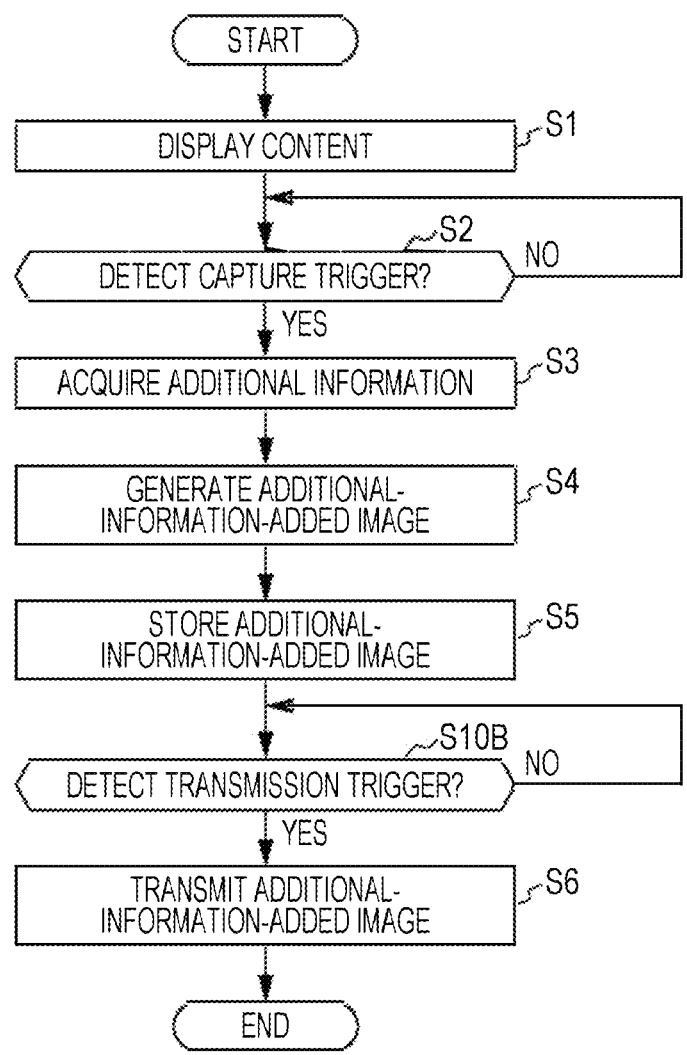
FIG. 6B is a flowchart illustrating another example of processing operations of the terminal apparatus in FIG. 4.

FIG. 6B is a flowchart illustrating another example of processing operations of the terminal apparatus 2' in FIG. 4. As illustrated, the processing may be performed in the following manner. In response to the capture trigger generated by the capture-trigger generation unit 243 being detected (YES in step S2), the additional information is acquired (step S3), the additional-information-added image is generated (step S4), and the additional-information-added image is stored (step S5), and, in response to the transmission trigger generated by the transmission-trigger generation unit 24A being detected (YES in step S10B), the additional-information-added image is transmitted (step S6).

FIG. 6C is a flowchart illustrating another example of processing operations of the terminal apparatus 2' in FIG. 4. As illustrated, the processing may be performed in the following manner. In response to the capture trigger generated by the capture-trigger generation unit 243 being detected (YES in step S2), the captured image is acquired (step S10A), and, in response to the transmission trigger generated by the transmission-trigger generation unit 24A being detected (YES in step S10B), the additional information is acquired (step S3), the additional-information-added image is generated (step S4), the additional-information-added image is stored (step S5), and the additional-information-added image is transmitted (step S6).

As processing in step S3 in this case, for example, the additional-information acquisition unit 245 may transmit, to the content distribution server 1, a request for acquiring additional information together with information indicating a capture timing and may acquire the additional information by receiving the additional information from the content distribution server 1.

Second Embodiment

In the first embodiment described above, content is transmitted from the content distribution server 1, and the terminal apparatus 2 causes the content to be displayed on the display 21. In a second embodiment to be described below, information necessary for generating content is transmitted from a content distribution server 1a, a terminal apparatus 2a generates the content on the basis of this information, and causes the content to be displayed on the display 21 (so-called client rendering). In the following description, points common to those in the first embodiment may be omitted.

Figure 7:
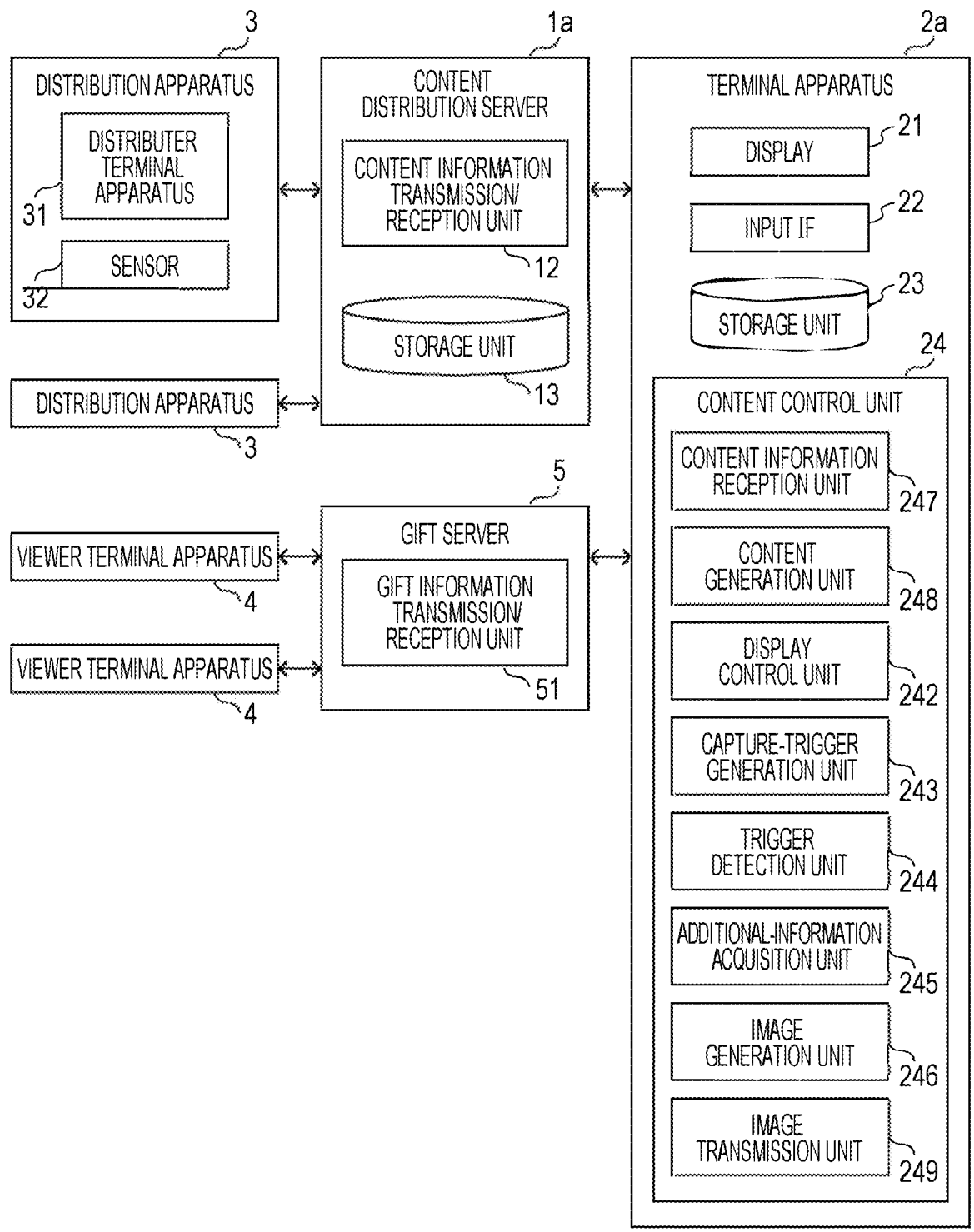
FIG. 7 is a block diagram illustrating a schematic configuration of an image processing system according to a second embodiment.

FIG. 7 is a block diagram illustrating a schematic configuration of an image processing system according to the second embodiment. The image processing system includes one or more distribution apparatuses 3, one or more content distribution servers 1a, one or more viewer terminal apparatuses 4, one or more gift servers 5, and the terminal apparatus 2a.

As an example, the content in this embodiment is assumed to be a three-dimensional virtual space in which one or more avatars act. Each avatar corresponds to a real performer. The speech and behavior of the performer are reflected by the speech and behavior of an avatar corresponding to the performer in the three-dimensional virtual space.

Specifically, the performer causes the corresponding avatar to act by using the distribution apparatus 3. The distribution apparatus 3 includes a distributor terminal apparatus 31 (e.g., smartphone) and a sensor 32 connected to the distributor terminal apparatus 31. In an exemplary implementation, distribution apparatus 3 includes processing circuitry that is configured to perform or control the functionality of distributor terminal apparatus 3 and sensor 32. The processing circuitry will be described later with respect to FIG. 15.

The sensor 32 includes a motion sensor, a microphone, etc. and acquires the speech and behavior of the distributor. Information indicating the speech and behavior of the distributor (hereinafter referred to as "motion information") is transmitted from the distributor terminal apparatus 31 to the content distribution server 1a.

In addition, avatar information is transmitted from the distributor terminal apparatus 31 to the content distribution server 1a. The avatar information is information regarding the avatar or the corresponding performer. The avatar information may include identification information of the performer and the corresponding avatar, information of the appearance of the avatar, identification information of parts (e.g., hairstyle, eyes, nose, and mouth) of the avatar, identification information of adornment (e.g., costume, shoes, and accessory) of the avatar, information indicating movement (including direction) of the parts (head or body) of the avatar, information indicating facial expression (e.g., eye movement or mouth movement) of the avatar, a URL associated with detailed information (e.g., profile or official website) of the avatar (or corresponding performer), etc. Note that the avatar is also an example of the object appearing in the content, and thus, the avatar information is, in other words, object information.

Furthermore, comment information may also be transmitted from the distributor terminal apparatus 31 to the content distribution server 1a. The comment information may include a comment from the distributor (i.e., performer), identification information of the distributor, an URL associated with detailed information linked thereto, etc. The comment information may also be transmitted from the viewer terminal apparatus 4, which will be described later, and/or the terminal apparatus 2a.

Note that the motion information, the avatar information, and the comment information may also be transmitted from a plurality of distribution apparatuses 3 to the content distribution server 1a. In this case, a plurality of avatars appear in the three-dimensional virtual space as the content.

Furthermore, a viewer of the content can cause a gift to be displayed in the content by using the viewer terminal apparatus 4 (e.g., smartphone). Specifically, gift information is transmitted from the viewer terminal apparatus 4 to a gift server 5. The gift information may include identification information of the viewer who causes the gift to be displayed, identification information of the gift to be displayed, identification information of the content to be displayed, a URL associated with detailed information (e.g., profile or official website) of the viewer who causes the gift to be displayed, etc. The gift information may also be transmitted from the distribution apparatus 3 and/or the terminal apparatus 2a.

In this embodiment, the content distribution server 1a includes a content information transmission/reception unit 12. The content information transmission/reception unit 12 does not transmit the content itself, but transmits, to the terminal apparatus 2a, various kinds of information that may be used for generating the content. The various kinds of information include, in addition to the avatar information and the motion information received from the distribution apparatus 3, the identification information of the content, identification information of a background of the three-dimensional virtual space, etc.

In addition, the gift server 5 includes a gift information transmission/reception unit 51. In an exemplary implementation, gift server 5 includes processing circuitry that is configured to perform or control the functionality of gift information transmission/reception unit 51. The processing circuitry will be described later with respect to FIG. 15.

The gift information transmission/reception unit 51 receives the gift information from the viewer terminal apparatus 4 and transmits the gift information to the terminal apparatus 2a. The gift information may also be used for generating the content.

Although the content distribution server 1a and the gift server 5 are separate servers in this embodiment, the content distribution server 1a and the gift server 5 may be integrated with each other.

The content control unit 24 of the terminal apparatus 2a includes a content information reception unit 247, a content generation unit 248, and the image transmission unit 249.

The content information reception unit 247 receives information received from the content distribution server 1a and the gift server 5 (hereinafter collectively referred to as "content information"). The content information is stored in the storage unit 23 as necessary.

On the basis of the content information, the content generation unit 248 generates the content. As a specific example, the content generation unit 248 generates video content in which an avatar based on the avatar information acts on the basis of the motion information in a three-dimensional virtual space. The three-dimensional virtual space may include a comment based on the comment information and a gift in accordance with the gift information. Then, the display control unit 242 causes the video content including the comment based on the received comment information and the gift based on the received gift information to be displayed on the display 21.

The additional-information acquisition unit 245 according to this embodiment can acquire additional information in accordance with a screen displayed on the display 21 at the capture timing, on the basis of the content information.

The additional-information acquisition unit 245 may notify the content distribution server 1a of the capture timing (information for identifying a user who uses the terminal apparatus 2a, as necessary) and request information in accordance with the screen displayed on the display 21 at the capture timing from the content distribution server 1a (e.g., via an application programming interface (API) of a content control application) to receive information necessary for acquiring the additional information.

That is, part of the information included in the above content information may be transmitted from the content distribution server 1a to the terminal apparatus 2a in response to a request from the additional-information acquisition unit 245. As a specific example, the content name, the identification information of a performer (or corresponding avatar) in the avatar information, and the URL associated with detailed information of the performer (or corresponding avatar) may be received from the content distribution server 1a in response to a request from the additional-information acquisition unit 245.

The image transmission unit 249 transmits a generated additional-information-added image to any given external apparatus. The transmitted image is stored in a storage apparatus accessible from the external apparatus. The external apparatus may be a management server of another application for displaying the additional-information-added image by the other application, such as an SNS application. Alternatively, the external apparatus may be the content distribution server 1a. Now, the latter case will be described below.

Figure 8:
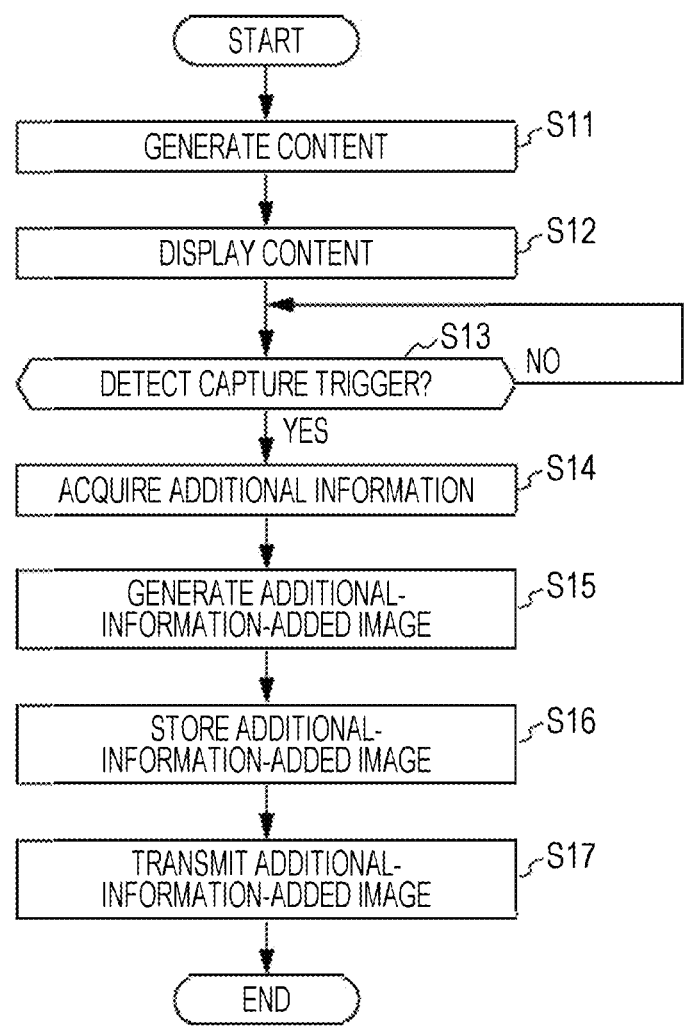
FIG. 8 is a flowchart illustrating an example of processing operations of a terminal apparatus in FIG. 7.

FIG. 8 is a flowchart illustrating an example of processing operations of the terminal apparatus 2a in FIG. 7.

On the basis of content information received by the content information reception unit 247, the content generation unit 248 generates content (step S11). Subsequently, the display control unit 242 causes the content generated by the content generation unit 248 to be displayed on the display 21 (step S12). While the content is being displayed, at any given point in time at which capture is desired, a user of the terminal apparatus 2a can select the capture icon 92 in FIG. 2, for example, to generate a capture trigger.

In response to the capture trigger being detected by the trigger detection unit 244 (YES in step S13), on the basis of the content information received by the content information reception unit 247 in step S11, the additional-information acquisition unit 245 acquires additional information in accordance with details (screen) displayed on the display 21 at the capture timing. Alternatively, the additional-information acquisition unit 245 transmits the capture timing to the content distribution server 1a to acquire the additional information in accordance with the capture timing from the content distribution server 1a (step S14).

Subsequently, the image generation unit 246 captures the screen displayed on the display 21 at the capture timing and adds the additional information to it to generate an additional-information-added image (step S15). The generated additional-information-added image is stored in the storage unit 23 of the terminal apparatus 2a (step S16). In addition, the image transmission unit 249 transmits the additional-information-added image to the content distribution server 1a (step S17). The additional-information-added image is also stored in a storage unit 13 of the content distribution server 1a.

In the above manner, in response to the capture trigger being detected (step S13), without any further user operation, the additional information is acquired (step S14), the additional-information-added image is generated (step S15), the additional-information-added image is stored in the terminal apparatus 2a (step S16), the additional-information-added image is transmitted to the content distribution server 1a (step S17), and the additional-information-added image is stored in the content distribution server 1a.

Now, some specific examples of the additional information will be described.

The additional information may be information in accordance with a scene in the content displayed on the display 21 at the capture timing. More specifically, the additional information may be information regarding an object such as an avatar or adornment thereof displayed on the display 21 at the capture timing. Still more specifically, the additional information may be a name of the avatar (or corresponding performer, the same applies hereinafter) displayed on the display 21. Such additional information is acquired on the basis of the avatar information in the content information.

Figure 9A:
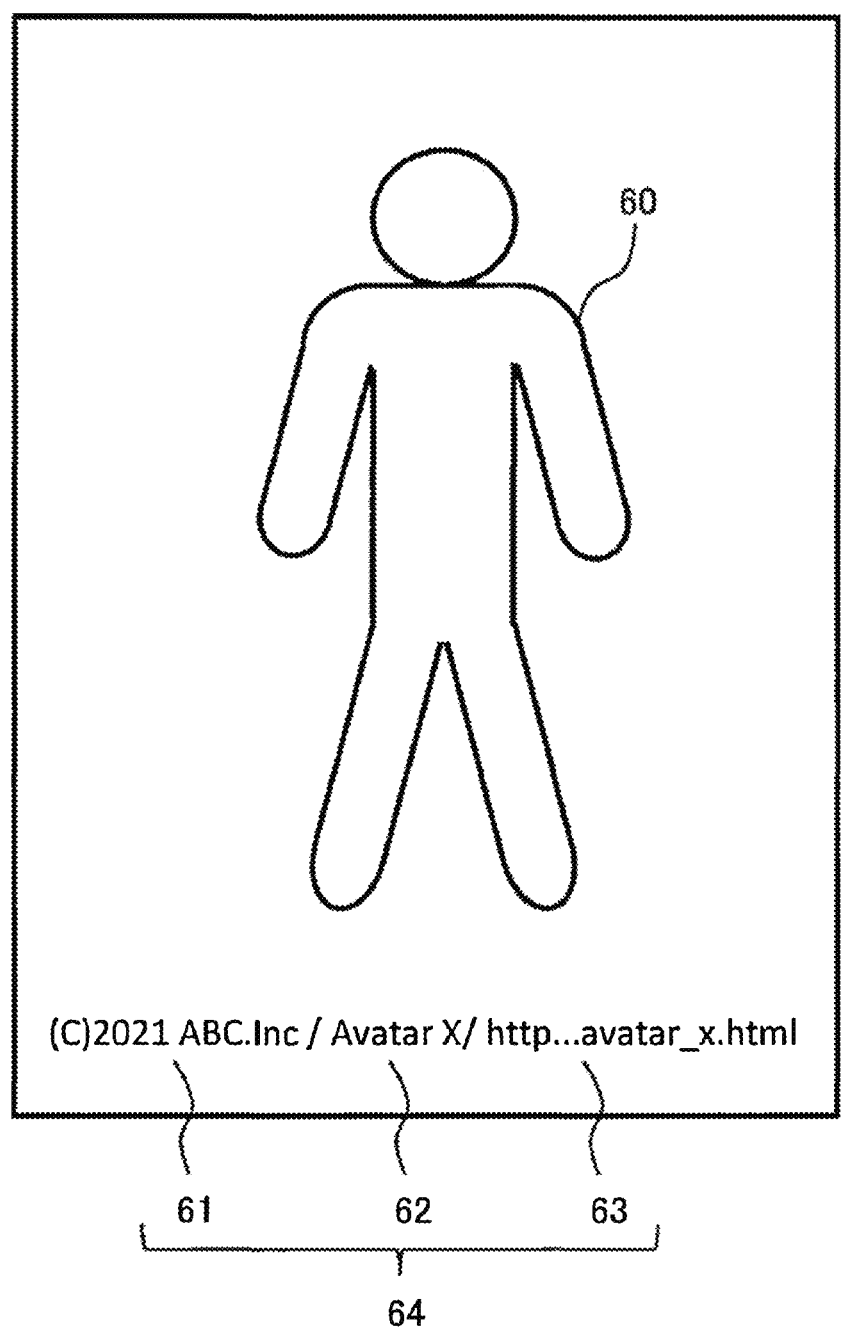
FIG. 9A schematically illustrates an example of an additional-information-added image.

In this case, the additional-information-added image may be the image illustrated in FIG. 9A, for example. In the image, a copyright notice 61, a name 62 of an avatar 60 displayed (appearing) at the capture timing, a URL 63 associated with detailed information of the avatar 60 (e.g., profile page, official page, SNS account, etc. of the avatar 60) may be added as the additional information under a captured image. Furthermore, such a URL may be associated as meta data of the additional-information-added image.

If, as the additional information, text such as the URL is to be superposed and displayed on the captured image, the additional-information acquisition unit 245 may add the text in a color (e.g., complementary color to the color of the image as a whole) in accordance with the color of the image and superpose the text on the image so that the text can be read with ease. The color of the image may be acquired from the content generation unit 248.

If, although a plurality of (e.g., 50) avatars appear in the content, only some (e.g., 2) of them appear at the capture timing, the additional information may include information regarding the only two avatars and may not necessarily include information regarding the other avatars that are not appearing at the capture timing. The additional-information acquisition unit 245 can acquire the avatars appearing at the capture timing on the basis of the content information.

Figure 9B:
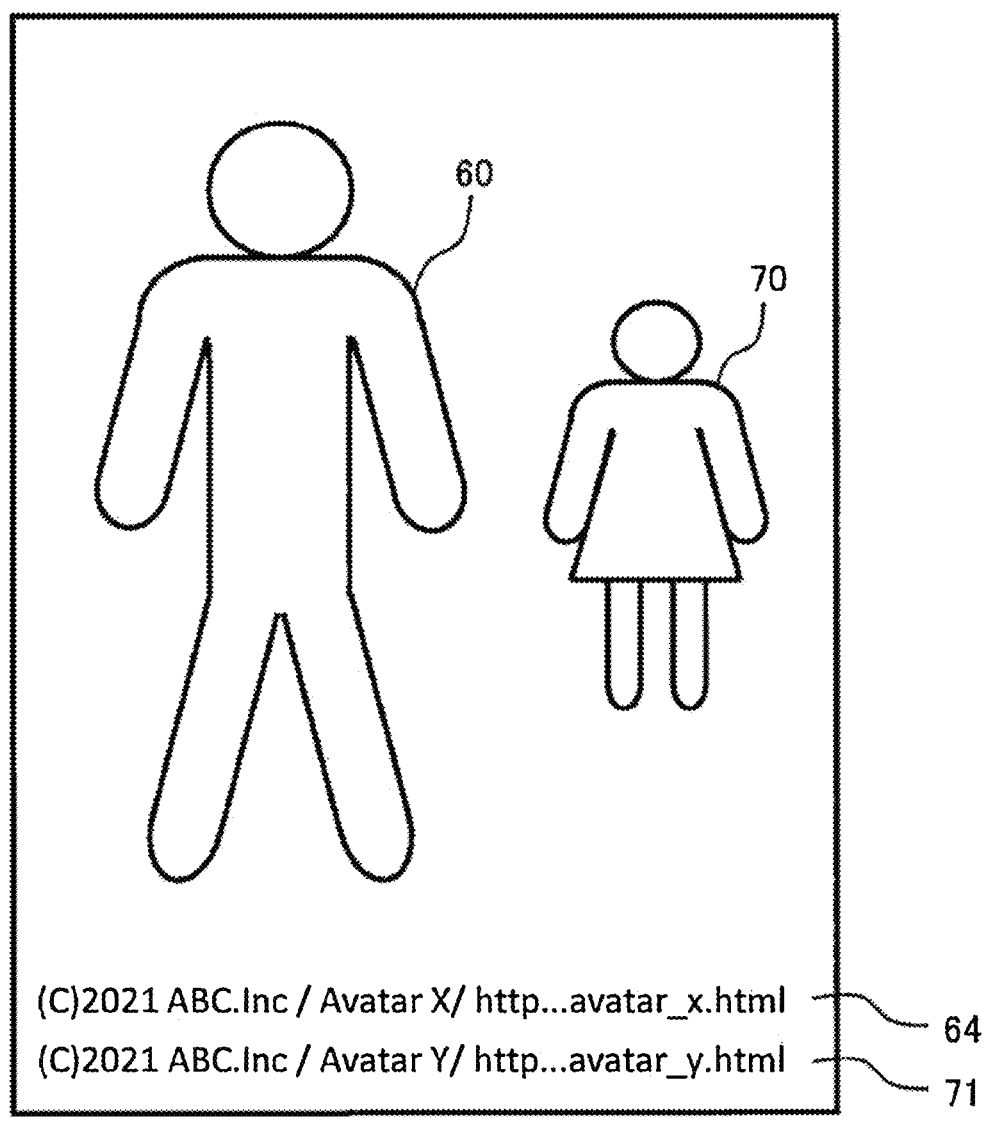
FIG. 9B schematically illustrates an example of the additional-information-added image.

In this case, the additional-information-added image may be the image illustrated in FIG. 9B, for example. In the image, a copyright notice, names of two avatars 60 and 70 displayed (appearing) at the capture timing, URLs associated with detailed information of performers corresponding to the two avatars 60 and 70 may be added as additional information 64 and additional information 71 under a captured image. Furthermore, such URLs may be associated as meta data of the additional-information-added image. Note that, if a large number of (e.g., 20 out of 50) avatars are appearing at the capture timing, the additional information may be information regarding only some (e.g., 2 out of 20) of the avatars, and in this case, the additional information does not include information regarding the other (e.g., the remaining 18 out of 20) avatars.

If a large number of avatars are appearing at the capture timing, priorities are given to the respective avatars, and the additional information may include information regarding only a predetermined number of avatars based on the priorities. Alternatively, each avatar may include a flag indicating whether the additional information includes the information regarding the avatar, and on the basis of this flag, the additional information may be generated.

The additional information may always, fixedly include information regarding a specific avatar (i.e., even if the specific avatar is not displayed on the display 21 at the capture timing), and in addition, the additional information may include information regarding the avatar displayed on the display 21 at the capture timing.

If the user posts such an additional-information-added image on a specific application (e.g., SNS application), the added URL is displayed in a manner accessible by viewers of the application. The accessible manner is, for example, a manner in which a URL is displayed in a specific region of the image, displayed as a hashtag, or automatically inserted into a post box.

Access to the URL enables various kinds of information to be referred to on a webpage etc. associated with the URL. In addition, information indicating that the generated additional-information-added image is an official image that is legitimately generated by the content distribution application can also be referred to. Furthermore, by making the URL a unique URL, a spreading state can be grasped from the number of accesses to the URL, and thereby, information indicating how much the generated additional-information-added image is spread can also be referred to. Note that the unique URL may be unique to specific additional information (e.g., for each avatar or content) or may be unique to the additional-information-added image. In the former case, the spreading state can be grasped in units of the specific additional information such as the avatar or the content. In the latter case, the spreading state can be grasped in units of the additional-information-added image.

In addition, upon the additional-information-added image being posted on the specific application, a hashtag based on the additional information may be automatically added. The hashtag is, for example, the content name, the avatar name, a related keyword, etc. A hashtag associated with the content information or the additional information is displayed on the application or automatically inserted into a post box. The displayed or inserted hashtag may be deleted or edited by the user. Since the hashtag is automatically inserted, the hashtag is standardized, and thereby, the post can be spread effectively and the user can make a post with ease.

Note that a post on the specific application such as an SNS application may be made manually by the user of the terminal apparatus 2 or automatically by the image transmission unit 249 upon the capture trigger being detected. In the former case, the image transmission unit 249 may indicate a recommendation of making a post on an SNS when the additional-information-added image is generated. In the latter case, in step S17 in FIG. 8, the image transmission unit 249 may present choices of applications (e.g., SNS application) on which a post is to be made, and the user can select a desired application from among the choices as an application on which a post is to be made.

The additional information may be a link or an advertisement related to the avatar. The link related to the avatar is, for example, an SNS account of a performer corresponding to the avatar, distributed content information, information of a piece of music included in the content, information of an object such as adornment used by the avatar (or a website for buying the object), a link to a URL associated with an official website of the avatar, etc. These pieces of information may also be included in the content information (avatar information).

In the above manner, in the second embodiment, in a case where the content information is received from the content distribution server 1a and the content is generated in the terminal apparatus 2a, the additional-information-added image can be generated in which the additional information in accordance with what is displayed (details displayed) on the display 21 is added to a captured image.

Note that the first embodiment and the second embodiment may be combined with each other. That is, in a case where the terminal apparatus 2a is provided with the content reception unit 241 in FIG. 1 and content is transmitted from the content distribution server 1, the display control unit 242 of the terminal apparatus 2a may cause the content to be displayed on the display 21. In addition, in a case where content information is transmitted from the content distribution server 1a, on the basis of the content information, the content control unit 24 of the terminal apparatus 2a may generate the content, and the display control unit 242 may cause the content to be displayed on the display 21.

Figure 10:
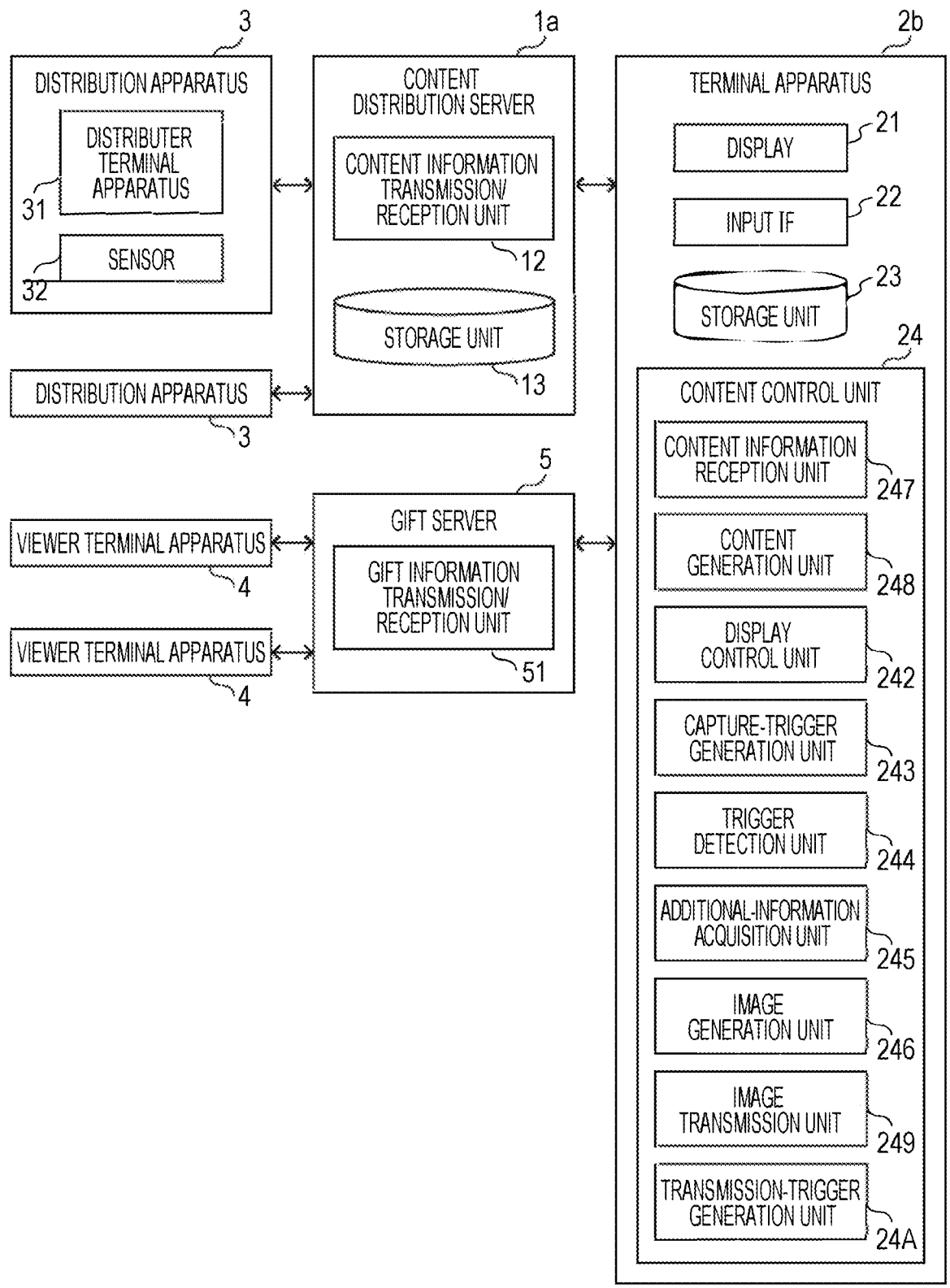
FIG. 10 is a block diagram illustrating a schematic configuration of an image processing system according to a modification of the image processing system in FIG. 7.

FIG. 10 is a block diagram illustrating a schematic configuration of an image processing system according to a modification of the image processing system in FIG. 7.

In the image processing system in FIG. 7, in response to a capture trigger being detected, without any further user operation, additional information is acquired, an additional-information-added image is generated, the additional-information-added image is stored in the terminal apparatus 2a, and the additional-information-added image is transmitted to the content distribution server 1a. In contrast, in the image processing system in FIG. 10, after a capture trigger is detected, in response to a transmission trigger being further generated by a user for transmitting an image, an additional-information-added image is generated, the additional-information-added image is stored in a terminal apparatus 2b, and the additional-information-added image is transmitted to the content distribution server 1a.

Specifically, the content control unit 24 in the terminal apparatus 2b in FIG. 10 includes the transmission-trigger generation unit 24A. In response to a predetermined operation being performed by a user using the input interface 22, the transmission-trigger generation unit 24A generates a transmission trigger for transmitting an additional-information-added image to the content distribution server 1a (external apparatus). More specifically, the transmission-trigger generation unit 24A provides a user with a GUI for generating a transmission trigger. In addition, in response to a predetermined operation being performed by a user on the GUI, the transmission-trigger generation unit 24A generates a transmission trigger.

For example, as illustrated in FIG. 5, the transmission-trigger generation unit 24A causes the transmission icon 93 (GUI) to be displayed in a region different from the content display region 91 and the capture icon 92 on the display 21. In response to the transmission icon 93 being selected by using the input interface 22, the transmission-trigger generation unit 24A generates a transmission trigger. The generated transmission trigger is detected by the trigger detection unit 244. That is, the trigger detection unit 244 detects both the capture trigger and the transmission trigger.

Figure 11A:
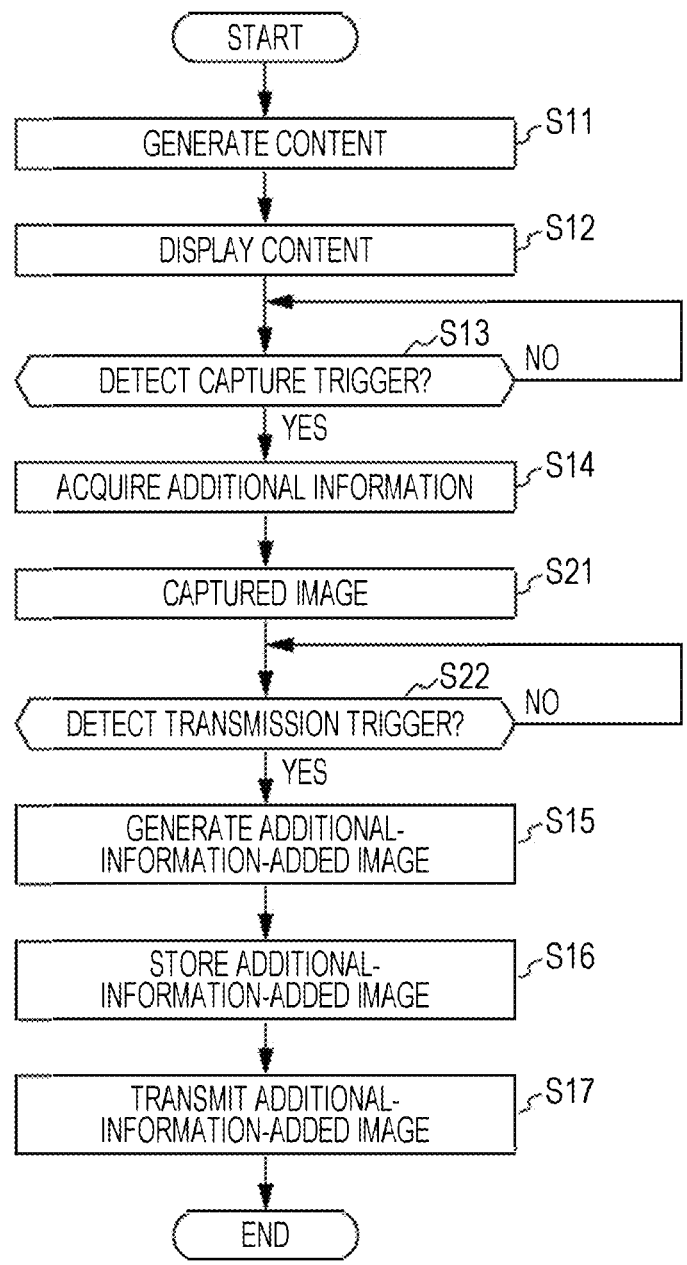
FIG. 11A is a flowchart illustrating an example of processing operations of a terminal apparatus in FIG. 10.

FIG. 11A is a flowchart illustrating an example of processing operations of the terminal apparatus 2b in FIG. 10. Processing common to that in FIG. 8 is denoted by a common reference numeral, and steps S11 to S14 are common to those in FIG. 8.

While an additional-information-added image is generated in response to a capture trigger in FIG. 8, in this modification illustrated in FIG. 11A, in response to a capture trigger being detected, the image generation unit 246 only captures a screen displayed on the display 21 at the capture timing (step S21), and stores the captured image in the storage unit 23 in the terminal apparatus 2b as necessary) and does not generate an additional-information-added image at this point in time.

In response to the transmission trigger being detected by the trigger detection unit 244 (YES in step S22), the image generation unit 246 adds additional information to the captured image acquired in step S21 to generate an additional-information-added image (step S15). The generated additional-information-added image is stored in the storage unit 23 in the terminal apparatus 2b (step S16). In addition, the image transmission unit 249 transmits the additional-information-added image to the content distribution server 1a (step S17). The additional-information-added image is also stored in the storage unit 13 of the content distribution server 1a.

In the above manner, in this modification, in response to the capture trigger being detected (step S13), without any further user operation, the additional information is acquired (step S14), and the screen is captured (step S21). Subsequently, in response to the transmission trigger being detected (step S22), without any further user operation, the additional-information-added image is generated (step S15), the additional-information-added image is stored in the terminal apparatus 2b (step S16), the additional-information-added image is transmitted to the content distribution server 1a (step S17), and the additional-information-added image is stored in the content distribution server 1a. In this modification, the additional-information-added image is generated in a case where the image is to be transmitted to the content distribution server 1a (external apparatus).

Note that in the terminal apparatus 2b in FIG. 11A, a user may select whether processing until the transmission of the additional-information-added image is to be performed in response to the capture trigger being detected (without detecting a transmission trigger) as illustrated in FIG. 8 or processing until the capturing of the screen is to be performed in response to the capture trigger being detected and processing until the transmission of the additional-information-added image is to be performed in response to the transmission trigger being detected as illustrated in FIG. 11A.

Figure 11B:
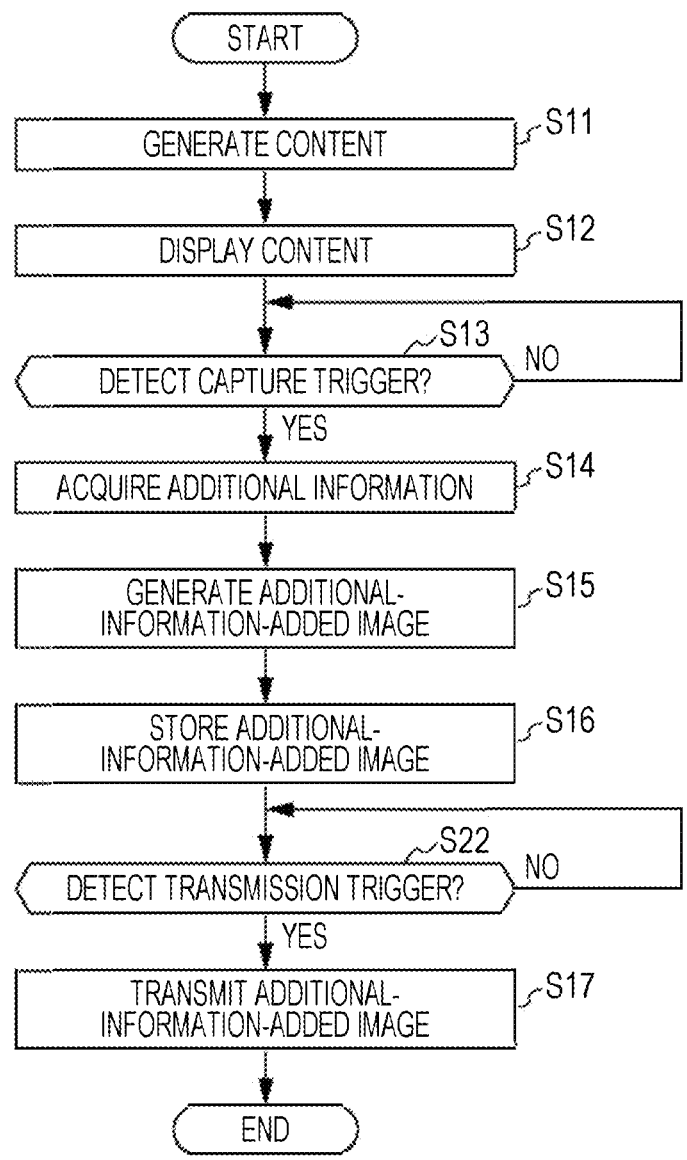
FIG. 11B is a flowchart illustrating another example of processing operations of the terminal apparatus in FIG. 10.

FIG. 11B is a flowchart illustrating another example of processing operations of the terminal apparatus 2b in FIG. 10. As illustrated, the processing may be performed in the following manner. In response to the capture trigger generated by the capture-trigger generation unit 243 being detected (YES in step S13), the additional information is acquired (step S14), the additional-information-added image is generated (step S15), and the additional-information-added image is stored (step S16), and, in response to the transmission trigger generated by the transmission-trigger generation unit 24A being detected (YES in step S22), the additional-information-added image is transmitted (step S17).

Figure 11C:
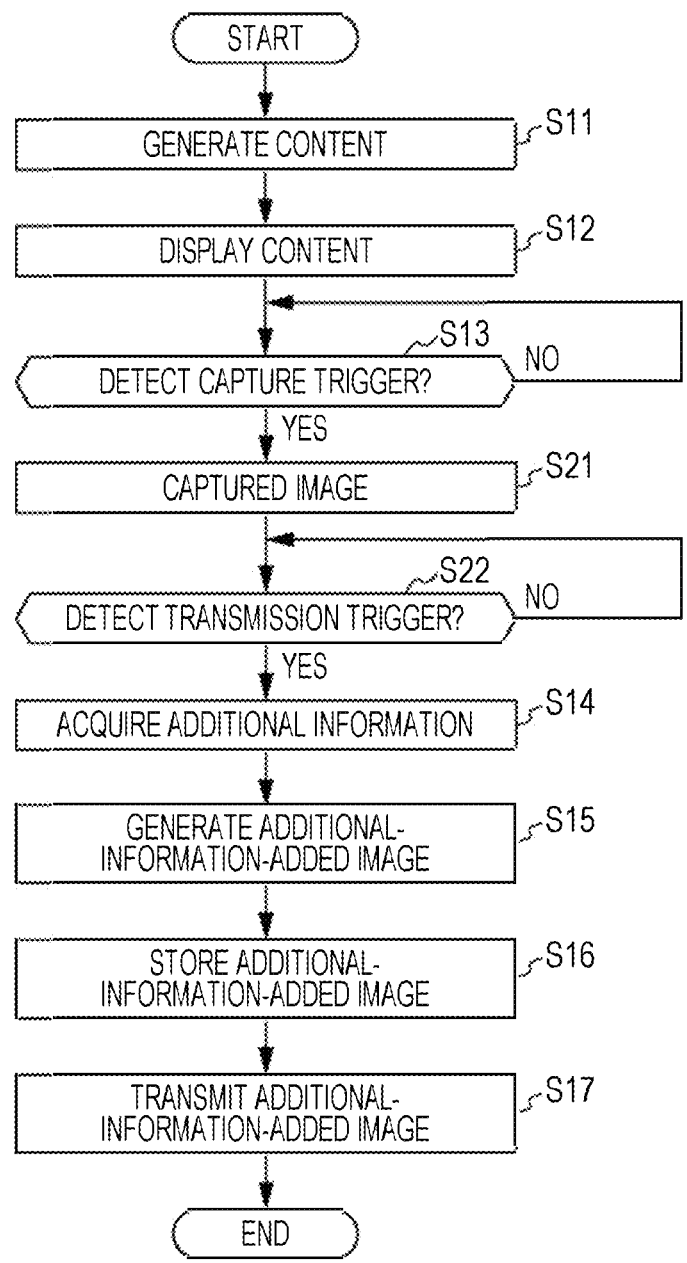
FIG. 11C is a flowchart illustrating another example of processing operations of the terminal apparatus in FIG. 10.

FIG. 11C is a flowchart illustrating another example of processing operations of the terminal apparatus 2b in FIG. 10. As illustrated, the processing may be performed in the following manner. In response to the capture trigger generated by the capture-trigger generation unit 243 being detected (YES in step S13), the captured image is acquired (step S21), and, in response to the transmission trigger generated by the transmission-trigger generation unit 24A being detected (YES in step S22), the additional information is acquired (step S14), the additional-information-added image is generated (step S15), the additional-information-added image is stored (step S16), and the additional-information-added image is transmitted (step S17).

As processing in step S14 in this case, for example, the additional-information acquisition unit 245 may transmit, to the content distribution server 1a, a request for acquiring additional information together with information indicating a capture timing and may acquire the additional information by receiving the additional information from the content distribution server 1a.

Third Embodiment

In a third embodiment to be described below, an additional-information-added image to be generated is assumed to be circulated as a unique digital asset. In the following description, as a specific example, on the basis of a standard in a marketplace, such as Ethereum (ERC-721 or ERC-1155), OpenSea, or Rarible, the additional-information-added image is to be circulated as a non-fungible token (NFT). A new market value of an image or a video of distributed content can be generated, thereby promoting circulation.

Figure 12:
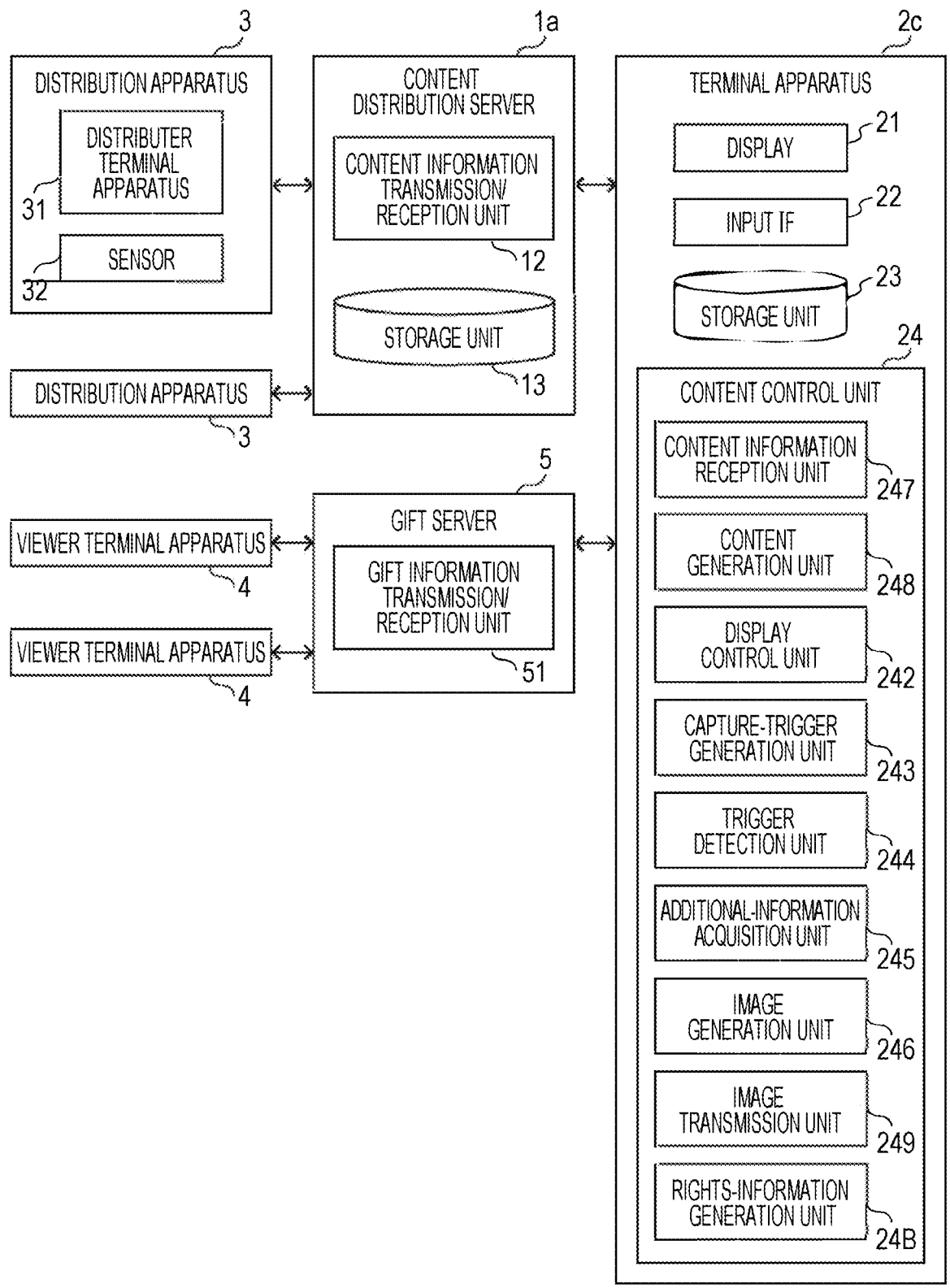
FIG. 12 is a block diagram illustrating a schematic configuration of an image processing system according to a third embodiment.

FIG. 12 is a block diagram illustrating a schematic configuration of an image processing system according to the third embodiment. Description common to that in the second embodiment will be omitted, and different points will be described below.

The content control unit 24 in a terminal apparatus 2c illustrated in FIG. 12 further includes a rights-information generation unit 24B. In response to a capture trigger being detected, or in response to an additional-information-added image being generated, the rights-information generation unit 24B generates, on the basis of content information as necessary, a unique rights information page that serves as a start point for circulating the additional-information-added image as an NFT (unique digital asset). The rights information page is constituted by various pieces of rights information, and at least part thereof is information for circulating the additional-information-added image as an NFT. At least part of the rights information may be included in additional information acquired by the additional-information acquisition unit 245.

The rights information includes identification information (ID) that is unique to the generated additional-information-added image.

In addition, the rights information may include information indicating a title. As a specific example, the title may be based on a content name or identification information of an avatar (or corresponding performer, the same applies hereinafter). In addition, the title may also be based on facial expression of the avatar included in content information or based on information related to a character or a performer included in a game or a video.

Furthermore, the rights information may include information indicating an application name and a right holder. Besides, the rights information may also include a URL associated with the application or a URL associated with the right holder. Specific examples of such a URL include a URL accessible to a content distribution application, a URL of a website of the right holder, and a URL of an official website of the content that is a target of the rights.

In addition, the rights information may include information indicating an avatar that is a distributor, an avatar displayed on the display 21 at the capture timing, or an object or a gift such as adornment of an avatar (as a specific example, a URL for obtaining (buying or applying for) a gift) or may include a URL associated with such an avatar, an object, or a gift. The information indicating an avatar is, for example, a profile including a name of the avatar, a URL of an official website of the avatar, a URL of a profile page, or an official SNS account.

Furthermore, the rights information may also include various other pieces of information regarding the additional-information-added image. If the additional-information-added image is a video, the rights information may include a thumbnail that is part of the video.

In addition, the rights information may also include timestamps of a time at which the additional-information-added image is generated and a time at which the additional-information-added image is publicized, and license information such as information as to whether the additional-information-added image can be redistributed or information on a period during which the additional-information-added image can be distributed. In addition, the rights information may also include information as to whether the additional-information-added image is for-profit or non-profit, information on the number of times the additional-information-added image can be copied and the number of times the additional-information-added image is copied at the current point in time, information on an owner of the additional-information-added image, a URL associated with buyer benefits information, or circulation information such as information on a market if the additional-information-added image is circulated as an NFT.

Otherwise, the rights information may also include any given information regarding the avatar. Note that all information to be included in the rights information may be automatically generated by the rights-information generation unit 24B, or part of the information to be included in the rights information may be generated on the basis of an operation by a user who issues a capturing instruction.

If the content is not a three-dimensional virtual space in which an avatar acts, the rights information may be information regarding any given object instead of the above-described information regarding the avatar. For example, if the content is content regarding a game application, the rights information may include a name of the game, saved data for reproducing a scene at the capture timing, a displayed character, information regarding a level, costume, etc. thereof, and a status of the character.

Upon the rights information page being generated, the additional-information-added image can be circulated in the NFT market. If the additional-information-added image is a video, only a thumbnail included in the rights information may be publicized on the rights information page, and only buyers may be allowed to obtain the full video. The full video may or may not include a copyright notice. If any piece of music is included in the video, the copyright can be included. In addition, a content ID etc. may be collated for the rights of the piece of music, and if the collation fails, the piece of music may be made silent or its sound quality may be lowered.

Figure 13:
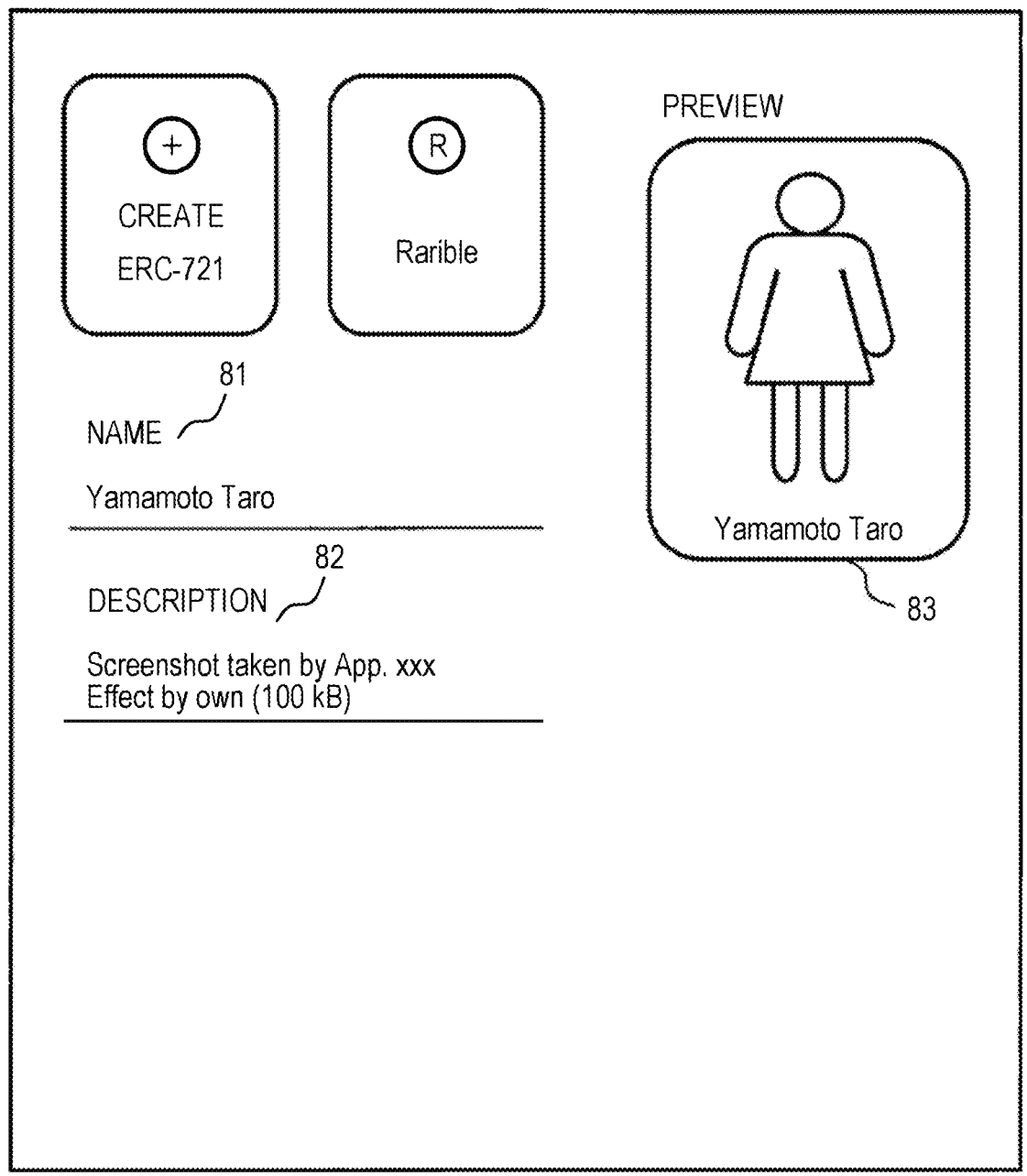
FIG. 13 schematically illustrates a rights information page.

In addition, the rights information page is associated with a URL. FIG. 13 schematically illustrates the rights information page. The rights information page includes the rights information. Specifically, the rights information page includes a name (person (i.e., owner) who has posted the additional-information-added image) 81, description (name of application) 82, etc. The rights information page may further preview information 83. The preview information 83 is a preview of a screen displayed on the basis of the rights information included in the rights information page if the rights information page is posted on another application (e.g., SNS application). In addition, the rights information page may also include information on a copyright holder, the quantity and price of images that can be circulated as an NFT, etc.

Figure 14:
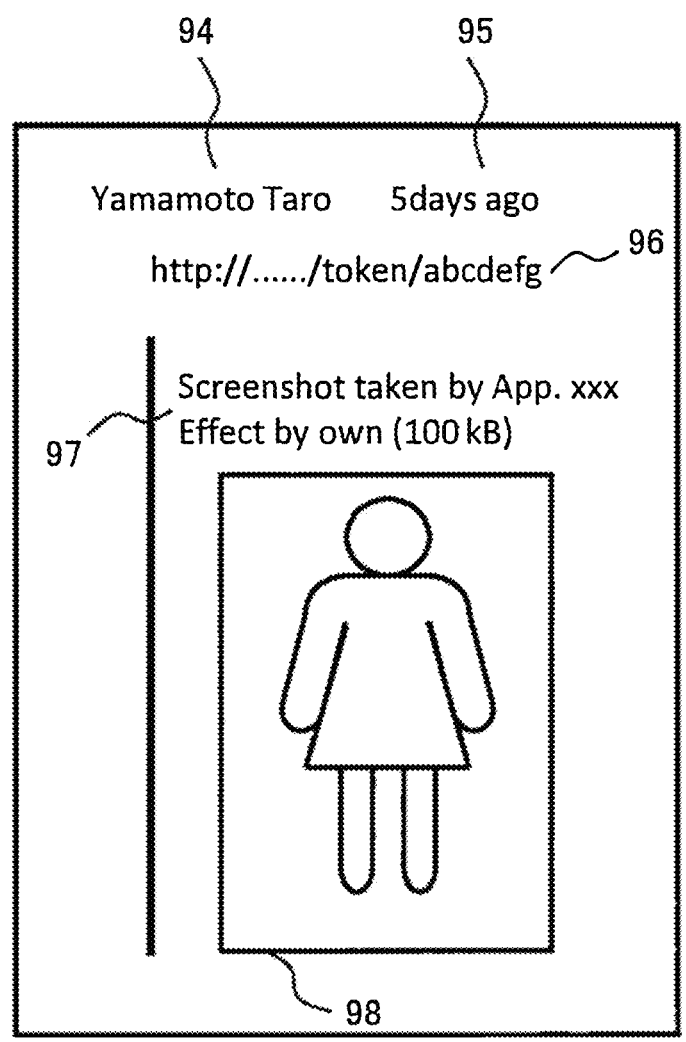
FIG. 14 schematically illustrates an example of a screen displayed on the basis of rights information.

Upon the URL associated with the rights information page being posted on another application (e.g., SNS application), a screen based on the rights information (see FIG. 14) is displayed. This screen corresponds to the preview information 83 in FIG. 13, and includes part or all of the rights information as image information or text information. The screen illustrated as an example in FIG. 14 includes a person 94 (i.e., owner) who has posted the additional-information-added image, a date 95 of the post, a URL 96 associated with the rights information page, a title-and-application-name 97 in the rights information, and an additional-information-added image 98.

Although this embodiment has illustrated an example in which the rights-information generation unit 24B is added to the terminal apparatus 2a in FIG. 7, the rights-information generation unit 24B may be added to the terminal apparatus 2 in FIG. 1 or the terminal apparatus 2b in FIG. 10. In addition, the timing for generating the rights information may be any timing as long as it is after the capture trigger has been detected.

In the above manner, in the third embodiment, the additional-information-added image can be circulated as a unique digital asset.

The additional-information-added image generated as an NFT herein can also function as a ticket.

As an example, an owner of such an additional-information-added image may be provided with benefits. As a more specific example, a user may be provided with experience related to the content in the rights information included in the additional-information-added image. As a still more specific example, only a user who is determined as an owner of the additional-information-added image can enter a specific zone in a three-dimensional virtual space, watch a predetermined video, or participate in a predetermined event.

In addition, only a user who has generated an additional-information-added image including rights information about a specific program or content may be provided with benefits. Promising advantages include promoting the user to capture an image and spreading and advertising the content. In addition, the additional-information-added image generated by capturing an image includes rights information, and the right holder is obvious. This enables spreading, circulation, and advertisement with the right protected appropriately. Furthermore, by promoting circulation of the additional-information-added image as an NFT and returning part of the reward to the right holder for each circulation, a legitimate profit can also be returned to the right holder. Note that the term "right holder" herein may be a distributor of the original content or may be a user who has captured the image (owner of the image).

The program referred to herein may be distributed by being recorded on a computer-readable recording medium non-transitorily, may be distributed via a communication line such as the Internet (including wireless communication), or may be distributed by being installed in a given terminal. The program may be implemented as a smart contract to be processed on the Ethereum blockchain.

In the embodiments above, the additional information may be a combination of information (e.g., logo of a content distribution service) that is added fixedly, regardless of details (screen) displayed on the display 21 at the capture timing and information in accordance with details (screen) displayed on the display 21 at the capture timing. In addition, examples of information on an avatar, a character, or a performer may include, in addition to a name thereof, information on a catch phrase, self-introduction, or group. In addition, in a case of a game character, the information may include attribute information such as rarity. Furthermore, if an image to be captured includes, or is likely to include, information that is desirably not spread, such as personal information, the part may be automatically obscured or sealed, or it may be noted that there is an inappropriate display for spreading in an area where comments from viewers are displayed.

In addition, although the embodiments have an aspect in which a capture trigger is generated in response to a user operation, the capture trigger may also be generated by a content control unit or a content distribution server. In the latter case, a right holder of the content, a distributor of the content, or a service operator can efficiently generate an additional-information-added image, which can be actively circulated or used for advertisement.

A person skilled in the art may arrive at additional effects or various modifications of the present disclosure on the basis of the above description. However, aspects of the present disclosure are not limited to the above embodiments. Various additions, changes, and partial deletion can be made without departing from the conceptual thought and gist of the present disclosure, derived from details and equivalents thereof prescribed in the claims.

For example, a single apparatus described herein (including a single apparatus depicted in the drawings) may be a plurality of apparatuses. Conversely, a plurality of apparatuses described herein (including a plurality of apparatuses depicted in the drawings) may be a single apparatus. Alternatively, part or all of units or functions included in a certain apparatus (e.g., server) may be included in another apparatus (e.g., user terminal). Easily inferred functions include setting of a resale right for an image to be distributed as an NFT and setting of a right for holding an auction, a right for editing a video, and a translation right.

In addition, not all the matters described herein are essential. In particular, a matter that is described herein but is not described in the claims is an optional matter.

It should be noted that the applicant knows the known invention described in "Description of the Related Art" herein, and that the present disclosure is not necessarily directed at solving the problems of the known invention. A problem to be solved by the present disclosure should be recognized by taking the whole specification into account. For example, if there is a description that a specific configuration produces a predetermined effect herein, a problem that is reverse to the predetermined effect may be solved. However, this description does not necessarily imply that such a specific configuration is essential.

Part of the disclosure described herein is directed at the following points. That is, if a user freely captures (acquiring a screenshot of) distributed content (e.g., video, program, game, or animation), the image displayed on the screen is captured as it is. If no processing is performed, the right holder of the captured image is unknown. In addition, if the captured image is spread on an SNS etc., the image might be used by a third party in a manner not intended by the right holder, with the right holder of the captured image remained unknown.

On the other hand, if capturing images by users are uniformly restricted, use of the content may be restricted more than necessary, and users' opportunities to enjoy the content may be restricted. Furthermore, even if capturing images are prohibited, once a technique to unlock the function for prohibiting image capturing is spread, images can be captured substantially unlimitedly, which may result in spreading and using an image in a manner not intended by the right holder.

Part of the disclosure described herein may produce the following effects. That is, by generating a captured image (additional-information-added image) in which additional information, such as rights information or related information of the content, is added in accordance with details of the captured image, viewers can be promoted to use the content while the rights of the distributed content are protected appropriately.

Since spreading can be promoted with the rights protected appropriately, users can enjoy the content by capturing images, which can be an advertisement for the right holder, realizing a win-win.

If the additional information includes a related URL, the following advantages are obtained. It becomes easy to grasp whether the URL is accessed from an additional-information-added image spread on an SNS etc. It is possible to estimate advertising effects of the accessed URL, and it is possible to grasp the route on which other official website etc. are accessed. Furthermore, it becomes easy to grasp the spreading state of the additional-information-added image.

If a hashtag is automatically added on the basis of the additional information, the following advantage is obtained. Users can be promoted to make a post on an SNS and spread it by adding a hashtag.

If the additional information includes a content name or rights information, the following advantages are obtained. By adding the content name or rights information, users can recognize the source or right holder of the distributed content and are likely to recognize that the content is protected as a right. In addition, an effect of suppressing modifications of the image in a manner not intended by the right holder can be expected. Furthermore, a user who has captured an image, of course, and also a user who views an additional-information-added image that is spread if spread on an SNS etc. can also recognize the right holder.

If the additional information is dynamically changed in accordance with details displayed on a display at a capture trigger, the following advantages are obtained. Although various kinds of information may be included in a piece of content, it is complex to include all the information in the additional information, which is difficult to appeal users. On the other hand, if the additional information is limited in advance, upon a capture trigger being generated at a predetermined timing in the content, information related to details displayed on the display at the time of the capture trigger may be absent in the additional information (which is particularly notable if the content includes a large amount of information). By adding information related to the content, an avatar, a gift, etc. included in the obtained captured image, it is possible to inform users of rights information appropriately. In addition, in a case of an URL of an avatar's official website, a website for buying a gift, etc., a more affective advertisement is obtained.

Making an image an NFT produces the following advantages. By making an NFT, a new economic value of an additional-information-added image acquired by a user is generated in the digital content market. By circulating an image or a video as an NFT, the right holder of the image can make a profit and can obtain and a legitimate profit as the right holder. In addition, a user who has circulated the image as an NFT can also make a profit.

Figure 15:
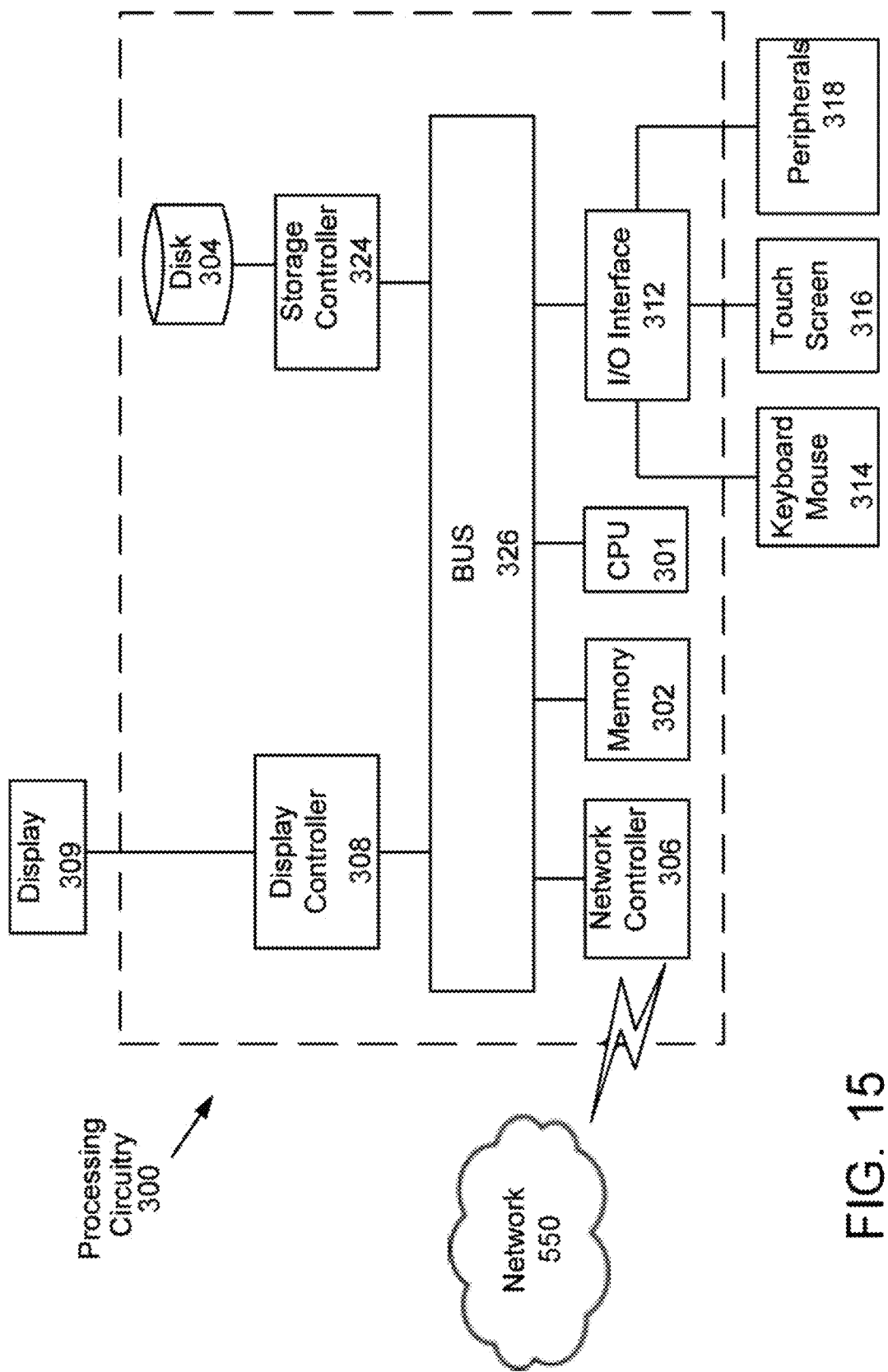
FIG. 15 is a block diagram of processing circuitry that performs computer-based operations in accordance with the present disclosure.

FIG. 15 is a block diagram of processing circuitry that performs computer-based operations in accordance with the present disclosure. FIG. 15 illustrates processing circuitry 300 utilized by components of content distribution server 1, terminal apparatus 2, distribution apparatus 3, viewer terminal apparatus 4 and/or gift server 5.

Processing circuitry 300 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 15, the processing circuitry 300 includes a CPU 301 which performs one or more of the control processes discussed in this disclosure. The process data and instructions may be stored in memory 302. These processes and instructions may also be stored on a storage medium disk 304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 300 communicates, such as a server or computer. The processes may also be stored in network based storage, cloud-based storage or other mobile accessible storage and executable by processing circuitry 300.

Further, the claimed advancements may be provided as a utility application, background daemon, or component of an operating system, or combination thereof, executing in conjunction with CPU 301 and an operating system such as Microsoft Windows, UNIX, Solaris, LINUX, Apple MAC-OS, Apple iOS and other systems known to those skilled in the art.

The hardware elements in order to achieve the processing circuitry 300 may be realized by various circuitry elements. Further, each of the functions of the above described embodiments may be implemented by circuitry, which includes one or more processing circuits. A processing circuit includes a particularly programmed processor, for example, processor (CPU) 301, as shown in FIG. 15. A processing circuit also includes devices such as an application specific integrated circuit (ASIC) and conventional circuit components arranged to perform the recited functions.

In FIG. 15, the processing circuitry 300 may be a computer or a particular, special-purpose machine. Processing circuitry 300 is programmed to execute processing to control components of corresponding content distribution server 1, terminal apparatus 2, distribution apparatus 3, viewer terminal apparatus 4 and/or gift server 5.

Alternatively, or additionally, the CPU 301 may be implemented on an FPGA, ASIC, PLD or using discrete logic circuits, as one of ordinary skill in the art would recognize. Further, CPU 301 may be implemented as multiple processors cooperatively working in parallel to perform the instructions of the inventive processes described above.

The processing circuitry 300 in FIG. 15 also includes a network controller 306, such as an Ethernet PRO network interface card, for interfacing with network 550. As can be appreciated, the network 550 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 550 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 306 may be compliant with other direct communication standards, such as Bluetooth, a near field communication (NFC), infrared ray or other.

The processing circuitry 300 further includes a display controller 308, such as a graphics card or graphics adaptor for interfacing with display 309, such as a monitor. An I/O interface 312 interfaces with a keyboard and/or mouse 314 as well as a touch screen panel 316 on or separate from display 309. I/O interface 312 also connects to a variety of peripherals 318.

The storage controller 324 connects the storage medium disk 304 with communication bus 326, which may be an ISA, EISA, VESA, PCI, or similar, for interconnecting all of the components of the processing circuitry 300. A description of the general features and functionality of the display 309, keyboard and/or mouse 314, as well as the display controller 308, storage controller 324, network controller 306, and I/O interface 312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

What is claimed is:

1. An image processing method, comprising:
   receiving content, the content including an avatar;
   displaying the avatar included in the content on a display;
   detecting a capture trigger for capturing a screenshot of the avatar included in the content displayed on the display;
   acquiring additional information identifying the avatar at a capture timing corresponding to a timing at which the capture trigger is detected;
   capturing the screenshot of the avatar included in the content displayed on the display at the capture timing;
   adding the additional information to the screenshot to generate an additional-information-added image;
   uploading the screenshot to a server for viewing by a plurality of users; and
   counting a number of views of the uploaded screenshot.

2. The image processing method according to claim 1, further comprising:
   determining whether predetermined conditions are met; and
   displaying, on the display, a content capture icon based on the predetermined conditions being determined to have been met.

3. The image processing method according to claim 2, wherein
   the content capture icon is a non-fungible token (NFT) generation button, and
   the screenshot of the content is an NFT.

4. The image processing method according to claim 1, wherein the screenshot of the content is a non-fungible token (NFT).

5. The image processing method according to claim 1, wherein the additional information includes information regarding an object included in a scene of the content displayed on the display at the capture timing.

6. The image processing method according to claim 1, further comprising:
   receiving content information; and
   receiving the content by generating the content based on the content information, wherein
   the additional information is acquired based on the content information.

7. The image processing method according to claim 6, wherein
   the content information includes object information regarding an object appearing in the content, and
   the additional information is acquired based on the object information.

8. The image processing method according to claim 7, wherein
   the object includes the avatar that acts in a three-dimensional virtual space, and
   the additional information includes information regarding the avatar and/or information regarding a performer corresponding to the avatar.

9. The image processing method according to claim 7, wherein
   the object appearing in the content includes a plurality of avatars that act in a three-dimensional virtual space, and
   in a case that a first avatar of the plurality of avatars is displayed on the display at the capture timing, the additional information includes information regarding at least part of the first avatar and/or information regarding at least part of a performer corresponding to the first avatar but does not include information regarding a second avatar of the plurality of avatars or information regarding a performer corresponding to the second avatar, the information regarding the first avatar being acquired based on the content information.

10. The image processing method according to claim 6, further comprising providing a notification of the capture timing to a content distribution server that transmits the content information, and acquires the additional information based on information received from the content distribution server in response to the notification.

11. The image processing method according to claim 6, further comprising transmitting the additional-information-added image to an external apparatus.

12. The image processing method according to claim 11, further comprising:
   generating, in response to a user operation, a transmission trigger for transmitting the additional-information-added image to the external apparatus,
   detecting the transmission trigger;
   capturing a screenshot of the content displayed on the display at the capture timing based on the capture trigger being determined to have been detected; and
   adding the additional information to the captured image to generate the additional-information-added image and transmitting the additional-information-added image to an external apparatus based on the transmission trigger being determined to have been detected.

13. The image processing method according to claim 1, further comprising generating a rights information page unique to the additional-information-added image.

14. The image processing method according to claim 13, wherein the rights information page includes information for circulating the additional-information-added image as a unique digital asset.

15. The image processing method according to claim 14, further comprising:
   receiving content information,
   generating the content on the basis of the content information;
   displaying the content on the display; and
   generating rights information that constitutes the rights information page based on the content information.

16. The image processing method according to claim 15, wherein
   the content information includes object information regarding an object appearing in the content, and
   the generating the rights information is further performed based on the object information.

17. The image processing method according to claim 16, wherein
   the object includes the avatar that acts in a three-dimensional virtual space, and
   the rights information includes information regarding the avatar and/or information regarding a performer corresponding to the avatar.

18. The image processing method according to claim 1, wherein
   the additional information is an additional image in accordance with what is displayed on the display at the capture timing, and
   the adding the additional information to the screenshot includes superimposing the additional image on the screenshot to generate the additional-information-added image.

19. The image processing method according to claim 1, further comprising providing a user with a graphical user interface (GUI) for generating the capture trigger and generating the capture trigger in response to a user operation on the GUI.

20. A non-transitory computer readable medium storing computer executable instructions which, when executed by processing circuitry of a computer, cause the computer to:
  receive content, the content including an avatar;
  display the avatar included in the content on a display;
  detect a capture trigger for capturing a screenshot of the avatar included in the content displayed on the display;
  acquire additional information identifying the avatar at a capture timing corresponding to a timing at which the capture trigger is detected;
  capture the screenshot of the avatar included in the content displayed on the display at the capture timing;
  add the additional information to the screenshot to generate an additional-information-added image;
  upload the screenshot to a server for viewing by a plurality of users; and
  count a number of views of the uploaded screenshot.

21. An image processing system, comprising:
processing circuitry configured to
  receive content, the content including an avatar;
  display the avatar included in the content on a display;
  detect a capture trigger for capturing a screenshot of the avatar included in the content displayed on the display;
  acquire additional information identifying the avatar at a capture timing corresponding to a timing at which the capture trigger is detected;
  capture the screenshot of the avatar included in the content displayed on the display at the capture timing;
  add the additional information to the screenshot to generate an additional-information-added image
  upload the screenshot to a server for viewing by a plurality of users; and
  count a number of views of the uploaded screenshot.

\* \* \* \* \*